United States Patent
Ingah et al.

(10) Patent No.: US 10,353,577 B2
(45) Date of Patent: Jul. 16, 2019

(54) METHOD AND SYSTEM FOR IMPLEMENTING CONTENT NAVIGATION OR SELECTION USING TOUCH-BASED INPUT

(71) Applicant: CenturyLink Intellectual Property LLC, Denver, CO (US)

(72) Inventors: Zubin Ingah, Centennial, CO (US); Michael D. Sprenger, Boulder, CO (US)

(73) Assignee: CenturyLink Intellectual Property LLC, Broomfield, CO (US)

( * ) Notice: Subject to any disclaimer, the term of this patent is extended or adjusted under 35 U.S.C. 154(b) by 240 days.

(21) Appl. No.: 15/477,376

(22) Filed: Apr. 3, 2017

(65) Prior Publication Data

US 2018/0095656 A1  Apr. 5, 2018

Related U.S. Application Data

(60) Provisional application No. 62/403,843, filed on Oct. 4, 2016.

(51) Int. Cl.

| | |
|---|---|
| *G06F 3/0488* | (2013.01) |
| *G06F 3/0482* | (2013.01) |
| *G06F 3/14* | (2006.01) |
| *H04N 21/422* | (2011.01) |
| *H04N 21/41* | (2011.01) |

(Continued)

(52) U.S. Cl.
CPC ........ *G06F 3/04883* (2013.01); *G06F 3/0482* (2013.01); *G06F 3/1423* (2013.01); *G06F 3/1454* (2013.01); *G09G 5/14* (2013.01); *H04N 21/4122* (2013.01); *H04N 21/4126* (2013.01); *H04N 21/4222* (2013.01); *H04N 21/42208* (2013.01); *H04N 21/42224* (2013.01); *H04N 21/4307* (2013.01); *H04N 21/43615* (2013.01); *H04N 21/47205* (2013.01); *H04N 21/482* (2013.01); *G06F 2203/04806* (2013.01); *G06F 2203/04808* (2013.01); *G09G 2340/045* (2013.01); *G09G 2340/0492* (2013.01);

(Continued)

(58) Field of Classification Search
CPC ....................................................... G09G 5/14
See application file for complete search history.

(56) References Cited

U.S. PATENT DOCUMENTS

| | | |
|---|---|---|
| 5,852,438 A | 12/1998 | Tomizawa |
| 6,032,156 A | 2/2000 | Marcus |

(Continued)

*Primary Examiner* — Mandrita Brahmachari

(57) ABSTRACT

Novel tools and techniques are provided for implementing media content streaming or playback, and, more particularly, for implementing content navigation or selection using touch-based input. In various embodiments, a computing system might display a first video content on a display screen of a main display device and on a touchscreen display of a user device, the first video content displayed on one mirroring that displayed on the other. In response to receiving user input via the touchscreen display, the computing system might shift display of the first video content along a first direction consistent with the user input while displaying and shifting display of a second video content along the first direction such that the two video content are adjacent to each other during shifting. The computing system might mirror the display and the shifting of the display of the first and the second video content on the display screen.

31 Claims, 15 Drawing Sheets

(51) Int. Cl.
*H04N 21/472* (2011.01)
*G09G 5/14* (2006.01)
*H04N 21/43* (2011.01)
*H04N 21/436* (2011.01)
*H04N 21/482* (2011.01)

(52) U.S. Cl.
CPC ... *G09G 2340/12* (2013.01); *G09G 2340/125* (2013.01); *G09G 2340/14* (2013.01)

(56) References Cited

U.S. PATENT DOCUMENTS

| | | | |
|---|---|---|---|
| 9,071,867 B1* | 6/2015 | Ray | H04N 21/458 |
| 9,620,169 B1 | 4/2017 | Nolan | |
| 9,838,731 B1 | 12/2017 | Matias | |
| 2003/0059198 A1 | 3/2003 | Yagura | |
| 2011/0019102 A1 | 1/2011 | Katsuya | |
| 2014/0092304 A1* | 4/2014 | Chen | H04N 21/4126 |
| | | | 348/552 |
| 2014/0241213 A1 | 8/2014 | Gumaer | |
| 2014/0288686 A1 | 9/2014 | Sant | |
| 2014/0310599 A1* | 10/2014 | Clift | H04N 21/4126 |
| | | | 715/719 |
| 2014/0355789 A1 | 12/2014 | Bohrarper | |
| 2015/0058732 A1 | 2/2015 | Nakamura | |
| 2015/0074599 A1* | 3/2015 | Stein | G06F 3/0482 |
| | | | 715/810 |
| 2015/0098590 A1 | 4/2015 | Oswell | |
| 2015/0135134 A1* | 5/2015 | Circlaeys | G06F 3/0481 |
| | | | 715/788 |
| 2015/0150044 A1 | 5/2015 | Jiang | |
| 2015/0363060 A1 | 12/2015 | Gaunt | |
| 2017/0300289 A1 | 10/2017 | Gattis | |
| 2018/0109837 A1 | 4/2018 | Sprenger et al. | |
| 2018/0176639 A1 | 6/2018 | Sprenger et al. | |

* cited by examiner

METHOD AND SYSTEM FOR IMPLEMENTING CONTENT NAVIGATION OR SELECTION USING TOUCH-BASED INPUT

CROSS-REFERENCES TO RELATED APPLICATIONS

This application claims priority to U.S. Patent Application Ser. No. 62/403,843 (the "'843 Application"), filed Oct. 4, 2016 by Zubin Ingah et al., entitled, "Novel Mechanism for Content Selection Using Touchscreen or Touchpad," the disclosure of which is incorporated herein by reference in its entirety for all purposes.

This application may be related to U.S. patent application Ser. No. 15/477,812 (the "'812 Application"), filed on a date even herewith by Michael D. Sprenger et al., entitled, "Method and System for Implementing Advanced Audio Shifting," which claims priority to U.S. Patent Application Ser. No. 62/435,992 (the "'992 Application"), filed Dec. 19, 2016 by Michael D. Sprenger et al., entitled, "Advanced Audio Fading Mechanism," the disclosures of both of which are incorporated herein by reference in their entirety for all purposes.

The respective disclosures of these applications/patents (which this document refers to collectively as the "Related Applications") are incorporated herein by reference in their entirety for all purposes.

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

The present disclosure relates, in general, to methods, systems, and apparatuses for implementing media content streaming or playback, and, more particularly, to methods, systems, and apparatuses for implementing content navigation or selection using touch-based input.

BACKGROUND

In conventional television, conventional video-on-demand ("VoD") systems, conventional streaming services and systems, conventional digital video recording ("DVR") systems, and/or the like, selection of content and/or channels requires the users to use cursor keys on a remote controller or remote control device, to use a mouse or similar pointing device, or to use similar kinds of keys or similar input methods to navigate to and select the desired channel or content item. In some cases, this can be a clumsy and tedious process.

Such conventional techniques for content and/or channel selection, however, do not utilize touch input on a user device to swipe through a plurality of content and tap to select particular content or channel, nor do these conventional techniques utilize shifting effects (e.g., scrolling, sliding, etc.). Such conventional techniques also do not allow for mirroring in real time (or near real time), on a main display device, the selection process that is displayed on the touchscreen-enabled user device with which the user is interacting. Further, such conventional techniques do not play video content (either clip or full video) while the user is selecting amongst the plurality of video content. Rather, such conventional techniques use still or static images (e.g., station or channel logos, content screen shots, poster images, or other representations of selected or currently playing content, etc.)

Hence, there is a need for more intuitive, robust, and scalable solutions for implementing media content streaming or playback, and, more particularly, to methods, systems, and apparatuses for implementing content navigation or selection using touch-based input.

BRIEF DESCRIPTION OF THE DRAWINGS

A further understanding of the nature and advantages of particular embodiments may be realized by reference to the remaining portions of the specification and the drawings, in which like reference numerals are used to refer to similar components. In some instances, a sub-label is associated with a reference numeral to denote one of multiple similar components. When reference is made to a reference numeral without specification to an existing sub-label, it is intended to refer to all such multiple similar components.

DETAILED DESCRIPTION OF CERTAIN EMBODIMENTS

Overview

Figure 1:
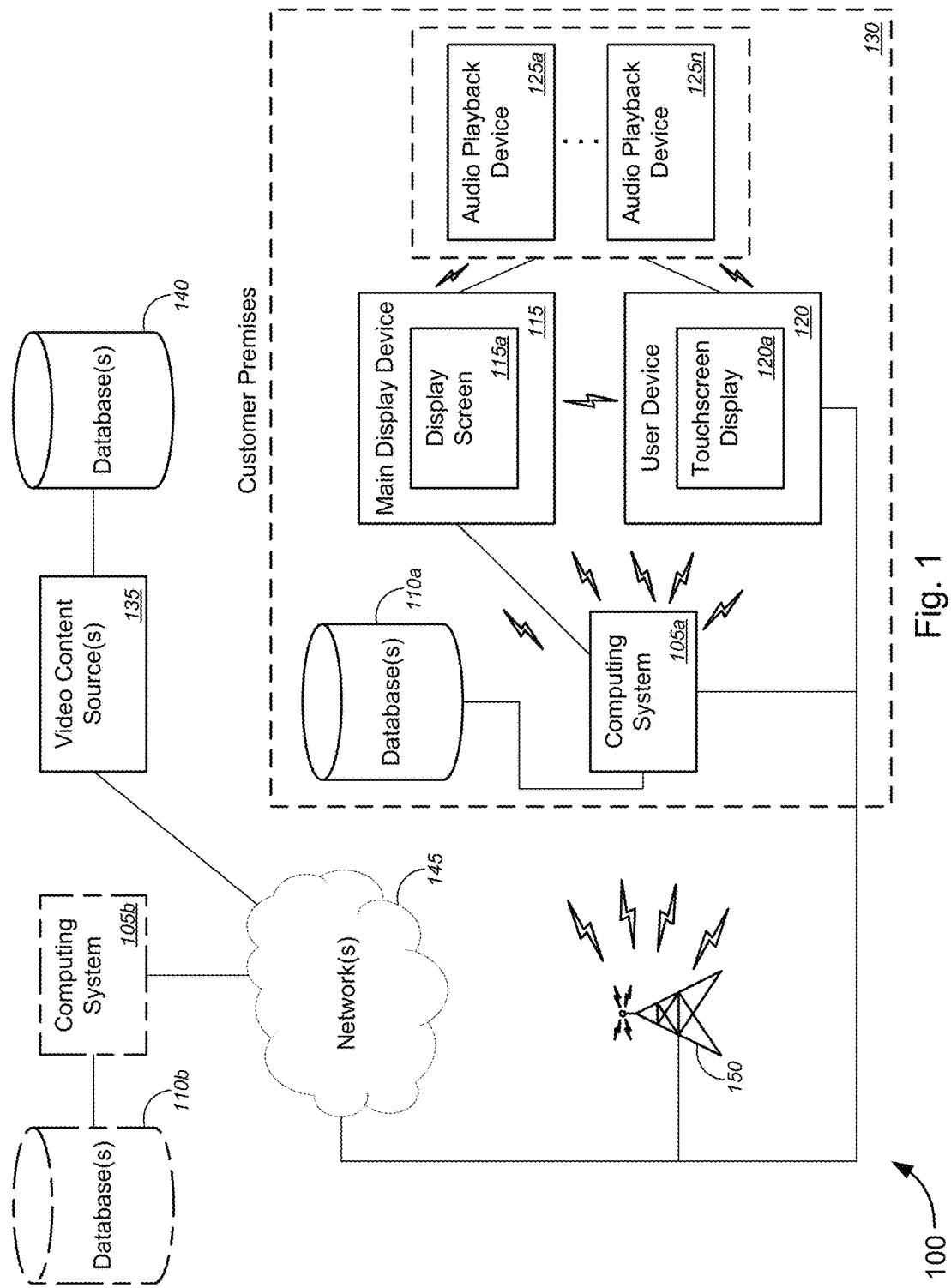
FIG. 1 is a schematic diagram illustrating a system for implementing content navigation or selection using touch-based input, in accordance with various embodiments.

Various embodiments provide tools and techniques for implementing media content streaming or playback, and, more particularly, to methods, systems, and apparatuses for implementing content navigation or selection using touch-based input.

In various embodiments, a computing system might display a first video content on at least a portion of a display screen of a main display device and display the first video content on at least a portion of a touchscreen display of a user device, the first video content being displayed on the at least a portion of the touchscreen display of the user device mirroring in real time (or near real time) the first video content being displayed on the at least a portion of the display screen of the main display device. The computing system might receive user input via the touchscreen display of the user device, the user input comprising a first swipe in a first direction relative to a reference point on the touchscreen display of the user device. In response to receiving the user input, the computing system might shift display of the first video content along the first direction on the at least a portion of the touchscreen display while displaying and shifting display of, with the computing system, a second video content along the first direction on the at least a portion of the touchscreen display such that the first video content and the second video content are adjacent to each other while display of the first video content and the second video content are being shifted. The computing system might mirror the display and the shifting of the display of the first video content and the second video content on the at least a portion of the display screen of the main display device in real time (or near real time).

According to some embodiments, the computing system might comprise one of a set-top box, a small streaming device (e.g., a "streaming stick," or the like), a digital video recording ("DVR") device, a processor on the main display device running a software application ("app"), a processor on the user device running an app, a server computer over a network, a cloud-based computing system over a network, a media player, or a gaming console, and/or the like. In some cases, the main display device might comprise one of a television set, a smart television, a projection system, a computer monitor, or a laptop monitor, and/or the like. In some instances, the user device might comprise one of a laptop computer, a tablet computer, a smart phone, a mobile phone, a personal digital assistant, a remote control device, or a portable gaming device, and/or the like.

In some embodiments, the shifting of the display of each of the first video content or the second video content might comprise one of a scrolling effect, a sliding effect, a flipping effect, a transitioning effect, or a dragging effect, and/or the like. Alternatively, or additionally, the shifting of the display of each of the first video content or the second video content might comprise dynamic cropping of each of the first video content or the second video content such that the first video content and the second video content maintain their display resolution and size while both are being partially displayed during shifting. In some cases, the first video content might be video content that is broadcast on a first broadcast channel, while the second video content might be video content that is broadcast on a second broadcast channel. In some instances, the first video content and the second video content might be video content among a plurality of video content available for browsing or viewing in one of a video on demand ("VoD") platform, a video streaming platform, a small streaming device (e.g., a "streaming stick," or the like), or a digital video recording ("DVR") platform, and/or the like.

Merely by way of example, the swiping direction might be vertical, horizontal, or diagonal, and/or the like. The first and second video content can be part of a plurality of video content, which in some cases might be arranged in a grid pattern, might be grouped by genre or category, might be episodes among a plurality of episodes in a series (or a season within a series), and/or the like. Additional user input might include zoom functionality. Hand gestures that are typically used to manipulate graphical user interfaces— including, but not limited to, "zoom and pinch" finger gestures, or the like—can be used to zoom in and out of a content grid pattern, or the like. Other user input might include fast swipe functionality, which allows for continuous and rapid shifting of multiple video content along a swipe direction (as described in detail below with respect to FIGS. 1, 3, and 4).

In some embodiments, audio presentation during shifting or during grid view might include presentation, through one or more audio playback devices or speakers communicatively coupled to one of the computing system, the main display device, or the user device, of one of audio content corresponding to a user-selected video content among a plurality of video content, audio content corresponding to a video content among two or more video content that fills a majority of the display area of the touchscreen display of the user device or of the display screen of the main display device, audio content corresponding to a video content among two or more video content that covers a center position of the display area of the touchscreen display of the user device or of the display screen of the main display device, and/or the like.

According to some embodiments, the computing system (and/or at least one of the user device or the main display device) might display content information associated with one or more of the video content on corresponding at least one of the touchscreen display of the user device or of the display screen of the main display device. The content information might include, but is not limited to, one or more of channel or stream information; title or name of video content; brief description of video content; information regarding actors, directors, production crew, studio, or persons of interest associated with the video content; length of video content; remaining length of video content playback; trailers; related content (e.g., prequels, sequels, other episodes in earlier seasons, other episodes in current season, other episodes in later seasons, etc.); filming locations; still pictures associated with the video content; trivia; and/or the like. In some embodiments, the content information might be either displayed overlaid over the corresponding video content or displayed in a separate portion of the at least one of the touchscreen display of the user device or of the display screen of the main display device on which neither the video content nor any other video content are being displayed.

The following detailed description illustrates a few exemplary embodiments in further detail to enable one of skill in the art to practice such embodiments. The described examples are provided for illustrative purposes and are not intended to limit the scope of the invention.

In the following description, for the purposes of explanation, numerous specific details are set forth in order to provide a thorough understanding of the described embodiments. It will be apparent to one skilled in the art, however, that other embodiments of the present invention may be practiced without some of these specific details. In other instances, certain structures and devices are shown in block diagram form. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

Unless otherwise indicated, all numbers used herein to express quantities, dimensions, and so forth used should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

Various embodiments described herein, while embodying (in some cases) software products, computer-performed methods, and/or computer systems, represent tangible, concrete improvements to existing technological areas, including, without limitation, media content streaming or downloading technology, media content navigation or selection technology, user interface technology and/or the like. In other aspects, certain embodiments, can improve the functioning of user equipment or systems themselves (e.g., media players, set-top boxes ("STBs"), media content streaming or downloading systems, etc.), for example, by receiving, with the computing system, user input via the touchscreen display of the user device, the user input comprising a first swipe in a first direction relative to a reference point on the touchscreen display of the user device; in response to receiving the user input, shifting, with the computing system, display of the first video content along the first direction on the at least a portion of the touchscreen display while displaying and shifting display of, with the computing system, a second video content along the first direction on the at least a portion of the touchscreen display such that the first video content and the second video content are adjacent to each other while display of the first video content and the second video content are being shifted; and mirroring (in real time (or near real time)), with the computing system, the display and the shifting of the display of the first video content and the second video content on the at least a portion of the display screen of the main display device, and/or the like. In particular, to the extent any abstract concepts are present in the various embodiments, those concepts can be implemented as described herein by devices, software, systems, and methods that involve specific novel functionality (e.g., steps or operations), such as, in response to receiving the user input, shifting, with the computing system, display of the first video content along the first direction on the at least a portion of the touchscreen display while displaying and shifting display of, with the computing system, a second video content along the first direction on the at least a portion of the touchscreen display such that the first video content and the second video content are adjacent to each other while display of the first video content and the second video content are being shifted; and mirroring (in real time (or near real time)), with the computing system, the display and the shifting of the display of the first video content and the second video content on the at least a portion of the display screen of the main display device, and/or the like, which optimizes presentation and navigation of the media content (particularly video content) thus providing for smoother and more efficient navigation of video content by the user, and/or the like, to name a few examples, that extend beyond mere conventional computer processing operations. These functionalities can produce tangible results outside of the implementing computer system, including, merely by way of example, optimized presentation and navigation of media content (including video content) to the user thus providing for smoother and more efficient navigation of video content by the user, and/or the like, at least some of which may be observed or measured by customers and/or service providers.

In an aspect, a method might comprise displaying, with a computing system, a first video content on at least a portion of a display screen of a main display device; and displaying, with the computing system, the first video content on at least a portion of a touchscreen display of a user device, the first video content being displayed on the at least a portion of the touchscreen display of the user device mirroring the first video content being displayed on the at least a portion of the display screen of the main display device. The method might also comprise receiving, with the computing system, user input via the touchscreen display of the user device, the user input comprising a first swipe in a first direction relative to a reference point on the touchscreen display of the user device; and, in response to receiving the user input, shifting, with the computing system, display of the first video content along the first direction on the at least a portion of the touchscreen display while displaying and shifting display of, with the computing system, a second video content along the first direction on the at least a portion of the touchscreen display such that the first video content and the second video content are adjacent to each other while display of the first video content and the second video content are being shifted. The method might further comprise mirroring, with the computing system, the display and the shifting of the display of the first video content and the second video content on the at least a portion of the display screen of the main display device.

In some embodiments, the computing system might comprise one of a set-top box, a small streaming device (e.g., a "streaming stick," or the like), a digital video recording ("DVR") device, a processor on the main display device running a software application ("app"), a processor on the user device running an app, a server computer over a network, a cloud-based computing system over a network, a media player, or a gaming console, and/or the like. In some cases, the main display device might comprise one of a television set, a smart television, a projection system, a computer monitor, or a laptop monitor, and/or the like. In some instances, the user device might comprise one of a laptop computer, a tablet computer, a smart phone, a mobile phone, a personal digital assistant, a remote control device, or a portable gaming device, and/or the like.

According to some embodiments, the shifting of the display of each of the first video content or the second video content might comprise one of a scrolling effect, a sliding effect, a flipping effect, a transitioning effect, or a dragging effect, and/or the like. Alternatively or additionally, the shifting of the display of each of the first video content or the second video content might comprise dynamic cropping of each of the first video content or the second video content such that the first video content and the second video content maintain their display resolution and size while both are being partially displayed during shifting. In some cases, the first video content might be video content that is broadcast on a first broadcast channel, while the second video content might be video content that is broadcast on a second broadcast channel. In some instances, the first video content and the second video content might be video content among a plurality of video content available for browsing or viewing in one of a video on demand ("VoD") platform, a video streaming platform, or a digital video recording ("DVR") platform, and/or the like. In some cases, mirroring the display and the shifting of the display of the first video content and the second video content on the at least a portion of the display screen of the main display device might comprise mirroring, with the computing system, the display and the shifting of the display of the first video content and the second video content on the at least a portion of the display screen of the main display device, in real time or near real time Merely by way of example, in some embodiments, the first direction might be one of a vertical direction with respect to a viewing orientation of the first video content or a horizontal direction with respect to the viewing orientation of the first video content, or the like. In some instances, the first video content and the second video content might be video content among a plurality of video content that are arranged in a grid pattern with one video content being adjacent to eight video content. The first direction, according to some embodiments, might be one of a diagonal direction with respect to a viewing orientation of the first video content, and, in response to receiving the user input comprising a swipe in the diagonal direction, portions of the plurality of video content in the grid pattern might be shifted along the diagonal direction on one or both of the touchscreen display of the user device or the display screen of the main display device. In some embodiments, the method might further comprise receiving, with the computing system, a second user input via the touchscreen display of the user device, the second user input comprising multiple-finger input indicating one of zoom-in or zoom-out; in response to receiving the second user input, performing, with the computing system, corresponding one of zooming in or zooming out of display of the plurality of video content in the grid pattern on the at least a portion of the touchscreen display; and mirroring, with the computing system, the corresponding one of zooming in or zooming out of the display of the plurality of video content in the grid pattern on the at least a portion of the display screen of the main display device.

According to some embodiments, the method might further comprise determining, with the computing system, whether the user has selected one of the plurality of video content; based on a determination that the user has selected one of the plurality of video content, presenting or continuing presenting, with the computing system, audio content associated with the selected one of the plurality of video content; and based on a determination that the user has not selected any of the plurality of video content, identifying, with the computing system, which one of the plurality of video content covers a center position of the at least a portion of the touchscreen display, and presenting or continuing presenting, with the computing system, audio content associated with the identified video content that covers the center position of the at least a portion of the touchscreen display. The audio content might be presented using at least one of an audio playback device that is integrated within the main display device, an audio playback device that is external yet communicatively coupled to the main display device, an audio playback device that is integrated within the user device, or an audio playback device that is external yet communicatively coupled to the user device, and/or the like.

Alternatively, or additionally, the method might further comprise determining, with the computing system, whether the second video content fills at least half of the at least a portion of the touchscreen display of the user device; based on a determination that the second video content fills less than half of the at least a portion of the touchscreen display of the user device, presenting or continuing presenting, with the computing system, first audio content associated with the first video content; and based on a determination that the second video content fills at least half of the at least a portion of the touchscreen display of the user device, presenting or continuing presenting, with the computing system, second audio content associated with the second video content. Each of the first audio content or the second audio content might be presented using at least one of an audio playback device that is integrated within the main display device, an audio playback device that is external yet communicatively coupled to the main display device, an audio playback device that is integrated within the user device, or an audio playback device that is external yet communicatively coupled to the user device, and/or the like.

In some embodiments, the method might further comprise displaying, with the computing system, content information associated with each of at least one of the first video content or the second video content on one or both of the display screen of the main display device or the touchscreen display of the user device. The content information might be either displayed overlaid over corresponding at least one of the first video content or the second video content or displayed in a separate portion of the one or both of the display screen of the main display device or the touchscreen display of the user device on which neither the first video content nor the second video content are being displayed, or the like.

In another aspect, an apparatus might comprise at least one processor and a non-transitory computer readable medium communicatively coupled to the at least one processor. The non-transitory computer readable medium might have stored thereon computer software comprising a set of instructions that, when executed by the at least one processor, causes the apparatus to: display a first video content on at least a portion of a display screen of a main display device; display the first video content on at least a portion of a touchscreen display of a user device, the first video content being displayed on the at least a portion of the touchscreen display of the user device mirroring the first video content being displayed on the at least a portion of the display screen of the main display device; receive user input via the touchscreen display of the user device, the user input comprising a first swipe in a first direction relative to a reference point on the touchscreen display of the user device; in response to receiving the user input, shift display of the first video content along the first direction on the at least a portion of the touchscreen display while displaying and shifting display of a second video content along the first direction on the at least a portion of the touchscreen display such that the first video content and the second video content are adjacent to each other while display of the first video content and the second video content are being shifted; and mirror the display and the shifting of the display of the first video content and the second video content on the at least a portion of the display screen of the main display device.

In some embodiments, the apparatus might comprise one of a set-top box, a small streaming device (e.g., a "streaming stick," or the like), a digital video recording ("DVR") device, a processor on the main display device running a software application ("app"), a processor on the user device running an app, a server computer over a network, a cloud-based computing system over a network, a media player, or a gaming console, and/or the like. In some cases, the main display device might comprise one of a television set, a smart television, a projection system, a computer monitor, or a laptop monitor, and/or the like. In some instances, the user device might comprise one of a laptop computer, a tablet computer, a smart phone, a mobile phone, a personal digital assistant, a remote control device, or a portable gaming device, and/or the like.

According to some embodiments, the shifting of the display of each of the first video content or the second video content might comprise one of a scrolling effect, a sliding effect, a flipping effect, a transitioning effect, or a dragging effect, and/or the like. Alternatively or additionally, the shifting of the display of each of the first video content or the second video content might comprise dynamic cropping of each of the first video content or the second video content such that the first video content and the second video content maintain their display resolution and size while both are being partially displayed during shifting. In some cases, the first video content might be video content that is broadcast on a first broadcast channel, while the second video content might be video content that is broadcast on a second broadcast channel. In some instances, the first video content and the second video content might be video content among a plurality of video content available for browsing or viewing in one of a video on demand ("VoD") platform, a video streaming platform, or a digital video recording ("DVR") platform, and/or the like.

Merely by way of example, in some embodiments, the first direction might be one of a vertical direction with respect to a viewing orientation of the first video content or a horizontal direction with respect to the viewing orientation of the first video content, or the like. In some instances, the first video content and the second video content might be video content among a plurality of video content that are arranged in a grid pattern with one video content being adjacent to eight video content. The first direction, according to some embodiments, might be one of a diagonal direction with respect to a viewing orientation of the first video content, and, in response to receiving the user input comprising a swipe in the diagonal direction, portions of the plurality of video content in the grid pattern might be shifted along the diagonal direction on one or both of the touchscreen display of the user device or the display screen of the main display device. In some embodiments, the set of instructions, when executed by the at least one processor, might further cause the apparatus to: receive a second user input via the touchscreen display of the user device, the second user input comprising multiple-finger input indicating one of zoom-in or zoom-out; in response to receiving the second user input, perform corresponding one of zooming in or zooming out of display of the plurality of video content in the grid pattern on the at least a portion of the touchscreen display; and mirror the corresponding one of zooming in or zooming out of the display of the plurality of video content in the grid pattern on the at least a portion of the display screen of the main display device.

According to some embodiments, the set of instructions, when executed by the at least one processor, might further cause the apparatus to: determine whether the user has selected one of the plurality of video content; based on a determination that the user has selected one of the plurality of video content, present or continue presenting audio content associated with the selected one of the plurality of video content; and based on a determination that the user has not selected any of the plurality of video content, identify which one of the plurality of video content covers a center position of the at least a portion of the touchscreen display, and present or continue presenting audio content associated with the identified video content that covers the center position of the at least a portion of the touchscreen display. The audio content might be presented using at least one of an audio playback device that is integrated within the main display device, an audio playback device that is external yet communicatively coupled to the main display device, an audio playback device that is integrated within the user device, or an audio playback device that is external yet communicatively coupled to the user device, and/or the like.

Alternatively, or additionally, the set of instructions, when executed by the at least one processor, might further cause the apparatus to: determine whether the second video content fills at least half of the at least a portion of the touchscreen display of the user device; based on a determination that the second video content fills less than half of the at least a portion of the touchscreen display of the user device, present or continue presenting first audio content associated with the first video content; and based on a determination that the second video content fills at least half of the at least a portion of the touchscreen display of the user device, present or continue presenting second audio content associated with the second video content. Each of the first audio content or the second audio content might be presented using at least one of an audio playback device that is integrated within the main display device, an audio playback device that is external yet communicatively coupled to the main display device, an audio playback device that is integrated within the user device, or an audio playback device that is external yet communicatively coupled to the user device, and/or the like.

In some embodiments, the set of instructions, when executed by the at least one processor, might further cause the apparatus to: display content information associated with each of at least one of the first video content or the second video content on one or both of the display screen of the main display device or the touchscreen display of the user device. The content information might be either displayed overlaid over corresponding at least one of the first video content or the second video content or displayed in a separate portion of the one or both of the display screen of the main display device or the touchscreen display of the user device on which neither the first video content nor the second video content are being displayed, or the like.

In yet another aspect, system a computing system, a main display device, and a user device. The computing system might comprise at least one first processor and a first non-transitory computer readable medium communicatively coupled to the at least one first processor. The first non-transitory computer readable medium might have stored thereon computer software comprising a first set of instructions that, when executed by the at least one first processor, causes the computing system to: send a first video content to a main display device for display of the first video content on the main display device; and send the first video content to a user device for display of the first video content on the display device, the first video content being displayed on the user device mirroring the first video content being displayed on the main display device.

The main display device might comprise a display screen, at least one second processor, and a second non-transitory computer readable medium communicatively coupled to the at least one second processor. The second non-transitory computer readable medium might have stored thereon computer software comprising a second set of instructions that, when executed by the at least one second processor, causes the main display device to: receive the first video content from the computing system; and display the first video content on at least a portion of the display screen of the main display device.

The user device might comprise a touchscreen display, at least one third processor, and a third non-transitory computer readable medium communicatively coupled to the at least one third processor. The third non-transitory computer readable medium might have stored thereon computer software comprising a third set of instructions that, when executed by the at least one third processor, causes the user device to: receive the first video content from the computing system; display the first video content on at least a portion of the touchscreen display of the user device; receive user input via the touchscreen display of the user device, the user input comprising a first swipe in a first direction relative to a reference point on the touchscreen display of the user device; and relay the received user input to the computing system.

The first set of instructions, when executed by the at least one first processor, might further cause the computing system to: receive the user input from the user device; in response to receiving the user input, send display commands to the user device to shift display of the first video content along the first direction on the at least a portion of the touchscreen display while displaying and shifting display of a second video content (in real time or near real time) along the first direction on the at least a portion of the touchscreen display such that the first video content and the second video content are adjacent to each other while display of the first video content and the second video content are being shifted; and send display commands to the main display device to mirror the display and shifting of the display of the first video content and the second video content (in real time or near real time) on the at least a portion of the display screen of the main display device.

The third set of instructions, when executed by the at least one third processor, might further cause the user device to: in response to receiving display commands from the computing system, shift display of the first video content along the first direction on the at least a portion of the touchscreen display while displaying and shifting display of a second video content along the first direction on the at least a portion of the touchscreen display such that the first video content and the second video content are adjacent to each other while display of the first video content and the second video content are being shifted. The second set of instructions, when executed by the at least one second processor, might further cause the main display device to: in response to receiving display commands from the computing system, mirror the display and shifting of the display of the first video content and the second video content (in real time or near real time) on the at least a portion of the display screen of the main display device.

In some embodiments, the apparatus might comprise one of a set-top box, a small streaming device (e.g., a "streaming stick," or the like), a digital video recording ("DVR") device, a processor on the main display device running a software application ("app"), a processor on the user device running an app, a server computer over a network, a cloud-based computing system over a network, a media player, or a gaming console, and/or the like. In some cases, the main display device might comprise one of a television set, a smart television, a projection system, a computer monitor, or a laptop monitor, and/or the like. In some instances, the user device might comprise one of a laptop computer, a tablet computer, a smart phone, a mobile phone, a personal digital assistant, a remote control device, or a portable gaming device, and/or the like.

Various modifications and additions can be made to the embodiments discussed without departing from the scope of the invention. For example, while the embodiments described above refer to particular features, the scope of this invention also includes embodiments having different combination of features and embodiments that do not include all of the above described features.

Specific Exemplary Embodiments

We now turn to the embodiments as illustrated by the drawings. FIGS. 1-6 illustrate some of the features of the method, system, and apparatus for implementing media content streaming or playback, and, more particularly, to methods, systems, and apparatuses for implementing content navigation or selection using touch-based input, as referred to above. The methods, systems, and apparatuses illustrated by FIGS. 1-6 refer to examples of different embodiments that include various components and steps, which can be considered alternatives or which can be used in conjunction with one another in the various embodiments. The description of the illustrated methods, systems, and apparatuses shown in FIGS. 1-6 is provided for purposes of illustration and should not be considered to limit the scope of the different embodiments.

With reference to the figures, FIG. 1 is a schematic diagram illustrating a system 100 for implementing content navigation or selection using touch-based input, in accordance with various embodiments.

In the non-limiting embodiment of FIG. 1, system 100 might comprise a computing system 105*a* and a data store or database 110*a* that is local to the computing system 105*a*. In some cases, the database 110*a* might be external, yet communicatively coupled, to the computing system 105*a*. In other cases, the database 110*a* might be integrated within the computing system 105*a*. System 100, according to some embodiments, might further comprise one or more main display devices 115 (collectively, "main display devices 115" or the like), which might each include a display screen 115*a*, and one or more user devices 120 (collectively, "user devices 120" or the like), which might each include a touchscreen display or touchscreen display device 120*a*, and/or the like. In some cases, system 100 might further, or optionally, comprise one or more audio playback devices 125*a*-125*n* (collectively, "audio playback devices 125" or "speakers 125" or the like), and/or the like. Each of the one or more main display devices 115 and/or the one or more user devices 120 might communicatively couple to the computing system 105*a*, and/or to each other, either via wireless connection and/or via wired connection. The one or more user devices 120 might each receive user input from a user (in various embodiments, receiving touch input from the user via the touchscreen display 120*a*), and might each relay the user input to the computing system 105*a*, according to some embodiments. In some cases, the user devices 120 might include, without limitation, at least one of a dedicated remote control device (with touchscreen display) that is associated with the computing system 105*a*, a universal remote control device (with touchscreen display) that has been paired, synced, or synchronized with the computing system 105*a*, a tablet computer that has been paired, synced, or synchronized with the computing system 105*a*, a smart phone that has been paired, synced, or synchronized with the computing system 105*a*, or other portable device (with touchscreen display) that has been paired, synced, or synchronized with the computing system 105*a*, and/or the like. In some cases, the computing system 105*a*, the database 110*a*, the one or more main display devices 115 (including the display screen(s) 115*a* and/or the audio playback device(s) 125, etc.), and the user device(s) 120 may be disposed within a customer premises 130, which might be one of a single family house, a multi-dwelling unit ("MDU") within a multi-dwelling complex (including, but not limited to, an apartment building, an apartment complex, a condominium complex, a townhouse complex, a mixed-use building, etc.), a motel, an inn, a hotel, an office building or complex, a commercial building or complex, an industrial building or complex, and/or the like.

In some embodiments, the computing system 105a might comprise one of a processor on the main display device running a software application ("app"), a processor on the user device running an app, a media player, and/or the like. In some cases, the media device might include, but is not limited to, one of a set-top box ("STB"), a small streaming device (e.g., a "streaming stick," or the like), a media player, a gaming console, a server computer, a desktop computer, or a laptop computer, and/or the like. The media player might include, without limitation, one of a digital versatile disc or digital video disc ("DVD") player, a Blu-ray disc ("BD") player, a player suitable for other forms of content storage media, a digital video recording ("DVR") device, a streaming video player, a streaming music player, or a streaming game player, and/or the like, while the one or more main display devices 115 might include, but are not limited to, at least one of one or more monitors (e.g., computer monitor or laptop monitor, or the like), one or more television sets (e.g., smart television sets or other television sets, or the like), one or more projection systems, and/or the like. In some cases, the user device 120 might include, without limitation, one of a laptop computer, a tablet computer, a smart phone, a mobile phone, a personal digital assistant, a remote control device, or a portable gaming device, and/or the like.

System 100 might further comprise one or more media content sources or servers 135 and corresponding databases 140 that might communicatively couple to the computing system 105a via one or more networks 145 (and in some cases, via one or more telecommunications relay systems 150, which might include, without limitation, one or more wireless network interfaces (e.g., wireless modems, wireless access points, and the like), one or more towers, one or more satellites, and/or the like). The lightning bolt symbols are used to denote wireless communications between the one or more telecommunications relay systems 150 and the computing system 105a, between the one or more telecommunications relay systems 150 and each of at least one of the user devices 120, between the computing system 105a and each of at least one of the main display devices 115, between the computing system 105a and each of at least one of the user devices 120, between the main display device 115 and the user devices 120, between the computing system 105a and each of the one or more audio playback devices 125a-125n, between the main display device 115 and each of at least one of the one or more audio playback devices 125a-125n, between the user devices 120 and each of at least one of the one or more audio playback devices 125a-125n, and/or the like. According to some embodiments, alternative or additional to the computing system 105a and corresponding database 110a being disposed within customer premises 130, system 100 might comprise remote computing system 105b and corresponding database(s) 110b that communicatively couple with the one or more main display devices 115 and/or with the one or more user devices 120 in the customer premises via the one or more networks 145 (and in some cases, via the one or more telecommunications relay systems 150). According to some embodiments, remote computing system 105b might comprise at least one of a server computer over a network, a cloud-based computing system over a network, and/or the like.

In operation, computing system 105a or 105b (and/or main display device 115) might display a first video content on at least a portion of a display screen 115a of the main display device 115. The computing system 105a or 105b (and/or the user device 120) might display the first video content on at least a portion of a touchscreen display 120a of the user device 120, the first video content being displayed on the at least a portion of the touchscreen display 120a of the user device 120 mirroring (in some cases, in real time (or near real time)) the first video content being displayed on the at least a portion of the display screen 115a of the main display device 115. In some cases, the resolution of the first video content that is displayed on the at least a portion of the touchscreen display 120a might be different from the resolution of the first video content that is displayed on the at least a portion of the display screen 115a. The computing system 105a or 105b (and/or the user device 120) might receive user input via the touchscreen display 120a of the user device 120, the user input, in some cases, comprising a first swipe in a first direction relative to a reference point on the touchscreen display 120a of the user device 120. In response to receiving the user input, the computing system 105a or 105b (and/or the user device 120) might shift display of the first video content along the first direction on the at least a portion of the touchscreen display 120a while displaying and shifting display of, with the computing system, a second video content along the first direction on the at least a portion of the touchscreen display 120a such that the first video content and the second video content are adjacent to each other while display of the first video content and the second video content are being shifted. The computing system 105a or 105b (and/or main display device 115) might mirror the display and the shifting of the display of the first video content and the second video content on the at least a portion of the display screen of the main display device (in some cases, in real time (or near real time)). In other words, the user's channel changes or content selection (via user interaction with the touchscreen display) would be reflected instantly and synchronously on the main display device.

In some embodiments, the shifting of the display of each of the first video content or the second video content might comprise one of a scrolling effect, a sliding effect, a flipping effect, a transitioning effect, or a dragging effect, and/or the like. Alternatively, or additionally, the shifting of the display of each of the first video content or the second video content might comprise dynamic cropping of each of the first video content or the second video content such that the first video content and the second video content maintain their display resolution and size while both are being partially displayed during shifting. In some cases, the first video content might be video content that is broadcast on a first broadcast channel, while the second video content might be video content that is broadcast on a second broadcast channel. In some instances, the first video content and the second video content might be video content among a plurality of video content available for browsing or viewing in one of a video on demand ("VoD") platform, a video streaming platform, or a digital video recording ("DVR") platform, and/or the like.

Merely by way of example, the swiping direction might be vertical (as shown and described below with respect to the embodiment of FIG. 3A), horizontal (as shown and described below with respect to the embodiment of FIG. 3B), or diagonal (as shown and described below with respect to the embodiment of FIG. 3F), and/or the like. The first and second video content can be part of a plurality of video content, which in some cases might be arranged in a grid pattern (as shown and described below with respect to the embodiment of FIG. 3D-3F), might be grouped by genre or category (as shown and described below with respect to the embodiment of FIG. 3C), might be episodes among a plurality of episodes in a series (or a season within a series) (as described below with respect to the embodiment of FIG. 3G), and/or the like. Additional user input might include zoom functionality (as shown and described below with respect to the embodiment of FIG. 3E, and as described below with respect to FIG. 3G). Hand gestures that are typically used to manipulate graphical user interfaces—including, but not limited to, "zoom and pinch" finger gestures, or the like—can be used to zoom in and out of a content grid pattern, or the like. Other user input might include fast swipe functionality, which allows for continuous and rapid shifting of multiple video content along a swipe direction (as described in detail below with respect to FIGS. 3 and 4). In some cases, with the fast swipe functionality, the continuous and rapid shifting of the multiple video content might incorporate a virtual "frictional" component that slows the continuous shifting over time (not unlike a roulette wheel or the like). Audible and/or visual effects might be added to support the notion of rapid and continuous shifting of multiple video content sources, including, without limitation, sound effects indicative of rapid video shifting, the slowing down of the continuous shifting over time due to a virtual "frictional" component, and/or the like. Alternatively, or additionally, for the fast swipe functionality, a user might stop the continuous and rapid shifting via user input including a tap and hold input or the like that causes the shifting to stop with the video content under the user's finger being stopped at its position within the at least one of the touchscreen display of the user device or of the display screen of the main display device.

In some embodiments, audio presentation during shifting or during grid view might include presentation, through one or more audio playback devices or speakers communicatively coupled to one of the computing system, the main display device, or the user device, of one of audio content corresponding to a user-selected video content among a plurality of video content, audio content corresponding to a video content among two or more video content that fills a majority of the display area of the touchscreen display of the user device or of the display screen of the main display device, audio content corresponding to a video content among two or more video content that covers a center position of the display area of the touchscreen display of the user device or of the display screen of the main display device, and/or the like.

According to some embodiments, the computing system (and/or at least one of the user device or the main display device) might display content information associated with one or more of the video content on corresponding at least one of the touchscreen display of the user device or of the display screen of the main display device. The content information might include, but is not limited to, one or more of channel or stream information; title or name of video content; brief description of video content; information regarding actors, directors, production crew, studio, or persons of interest associated with the video content; length of video content; remaining length of video content playback; trailers; related content (e.g., prequels, sequels, other episodes in earlier seasons, other episodes in current season, other episodes in later seasons, etc.); filming locations; still pictures associated with the video content; trivia; and/or the like. In some embodiments, the content information might be either displayed overlaid over the corresponding video content or displayed in a separate portion of the at least one of the touchscreen display of the user device or of the display screen of the main display device on which neither the video content nor any other video content are being displayed.

Generally, the user is able to select channels (i.e., live TV) and browse of content (such as content stored in VoD and/or DVR systems) by simply swiping a finger up and down (i.e., vertical), or left and right (i.e., horizontally), or diagonally on a touchscreen to select the next channel or content item.

For live programming, real-time live video are displayed (and potentially audio are presented) on the user's handheld device. Users can select the next channel or content item simply by swiping their finger up or down on the touchscreen (as shown and described below with respect to FIG. 3A). Alternative implementations may include the ability to swipe left and right (as shown and described below with respect to FIG. 3B). Alternatively, or additionally, the user might select the next channel or content item by swiping diagonally (as shown and described below with respect to FIG. 3F). The direction of swiping for channel and content selection could be configured by the user, configured by the operator offering the video service, or configured by the device vendor.

Content showing on the main display device (e.g., TV or the like) is synchronized with the content showing on the input device (i.e., user device or the like), including the partial display of a channel or content item as the user is scrolling or shifting from one channel or content item to the next.

There are multiple ways to handle meta data and content information, including, without limitation, showing meta data and/or content information on the touchscreen device, the TV or both; showing meta data and/or content information overlaid on real-time video (i.e., live TV) or on stored content title information (e.g., VoD, DVR, etc.); or showing meta data and/or content information separately in a dedicated screen area outside the live TV video or stored content title information. Meta data displays can be enabled/disabled by means of a dedicated touch gesture, including, but not limited to, double-tapping the video content representation, specific finger swipes, and/or the like.

The method of channel and content selection offers a convenient and very natural way for users to change channels and browse content on a VoD or DVR system. The touchscreen device can be provided by the user or the network operator. The touchscreen device communicates with a Set Top Box (STB) or directly with an app running on the TV, or the like. For the users, a novel, very natural and intuitive way is provided for selecting live TV channels or content items in a VoD or DVR system. This method does not require lengthy cursor navigation or the like. For the service provider, providing enhanced navigation features such as described herein is a way to distinguish such video services from those offered by competitors. For vendors, such functionality provides vendors with the ability to include advanced navigation capabilities while allows such vendors to distinguish themselves from other vendors.

These and other functions of the system 100 (and its components) are described in greater detail below with respect to FIGS. 2-4.

Figure 2A:
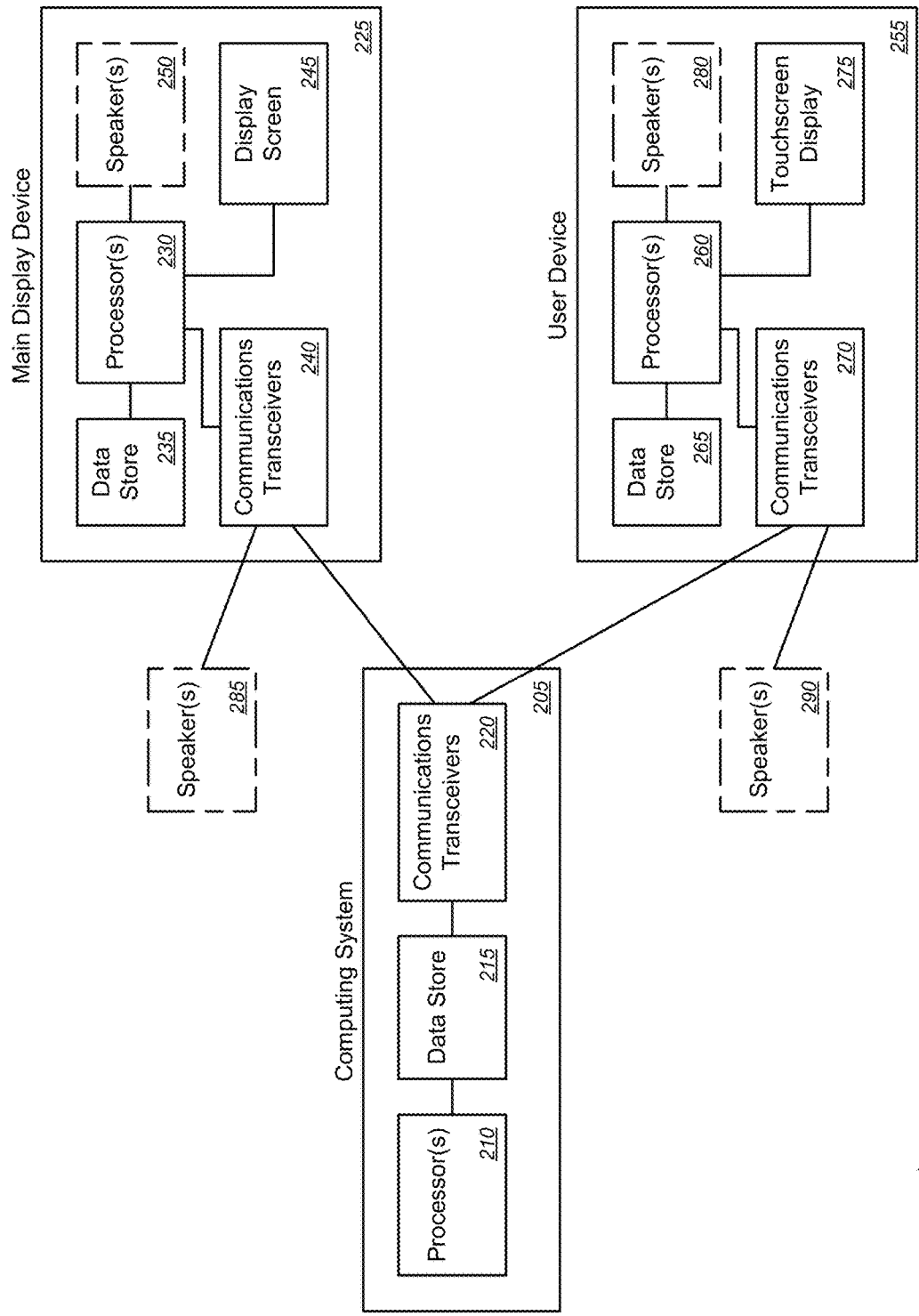
FIGS. 2A and 2B are schematic diagrams illustrating various embodiments of a system that may be used for implementing content navigation or selection using touch-based input.
Figure 2B:
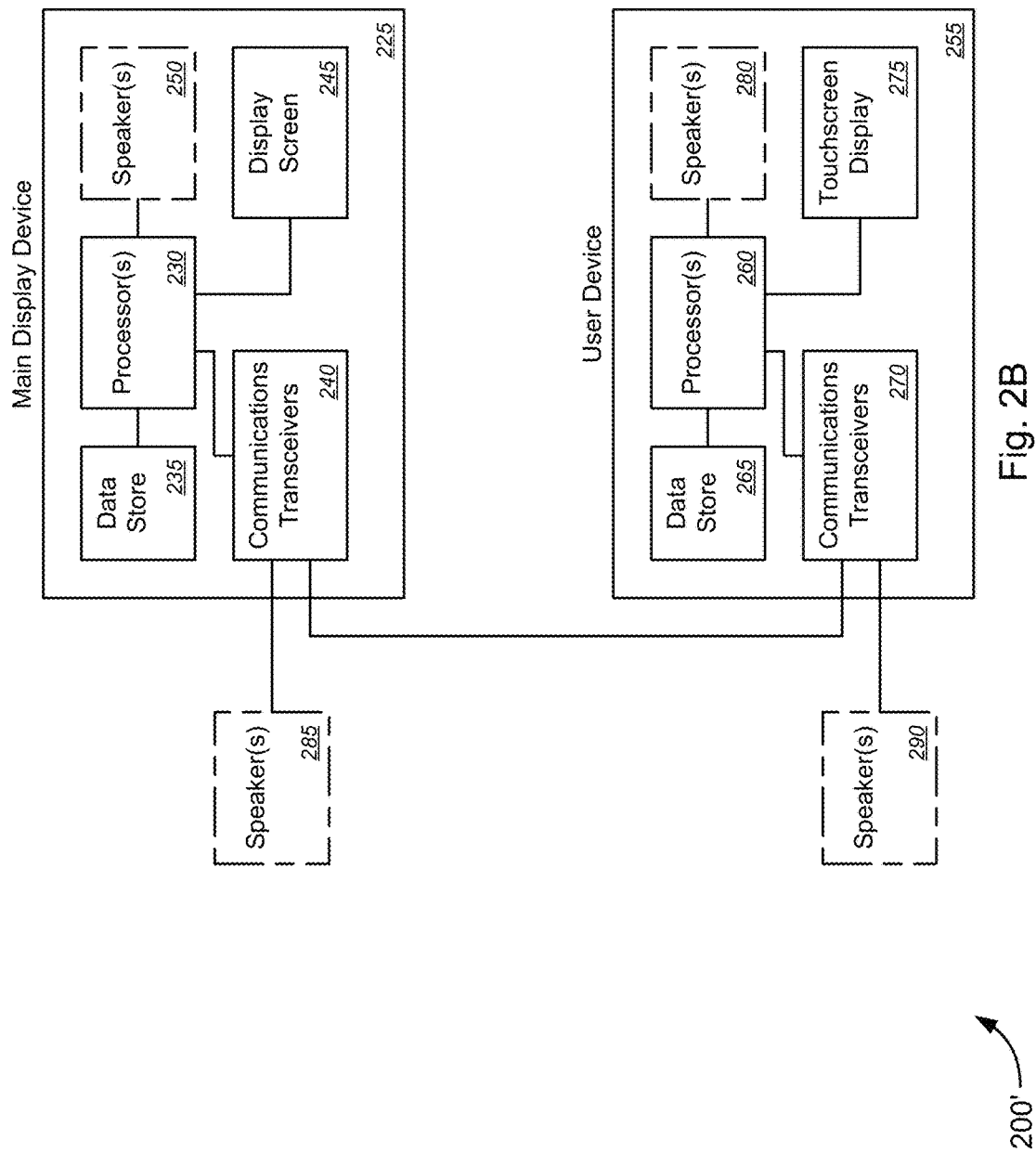

FIGS. 2A and 2B (collectively, "FIG. 2") are schematic diagrams illustrating various embodiments 200 and 200' of a system that may be used for implementing content navigation or selection using touch-based input.

In the non-limiting embodiment of FIG. 2A, according to some embodiments, system 200 might comprise a computing system 205 (which might correspond to computing system 105*a* or 105*b* of system 100 of FIG. 1, or the like). Computing system 205, in some cases, might comprise one or more processors 210, one or more data stores or data storage devices 215, and one or more communications transceivers 220, and/or the like. System 200 might further comprise one or more main display devices 225 (which might correspond to the one or more main display devices 115 of system 100 of FIG. 1, or the like), each of which might include, without limitation, one or more processors 230, one or more data stores 235, one or more communications transceivers 240, one or more display screens 245, and (optionally) one or more (built-in) speakers 250, and/or the like. System 200 might further comprise one or more user devices 255 (which might correspond to the one or more user devices 120 of system 100 of FIG. 1, or the like), each of which might include, but are not limited to, one or more processors 260, one or more data stores 265, one or more communications transceivers 270, one or more display screens 275, and (optionally) one or more (built-in) speakers 280, and/or the like. In some cases, system 200 might further comprise one or more external speakers 285 (which might communicatively couple either wirelessly or in a wired manner with at least one of the main display devices 225 (in some instances, via communications transceivers 240)) and one or more external speakers 290 (which might communicatively couple either wirelessly or in a wired manner with at least one of the user devices 255 (in some instances, via communications transceivers 270)), and/or the like. The computing system 205 might communicatively couple (via wireless or wired connection) with each of the main display devices 225 (in some cases, via communications transceivers 240) and with each of the user devices 255 (in some cases, via communications transceivers 270).

The computing system 205, the one or more main display devices 225, the one or more user devices 255, and the one or more (internal) speakers 250 or 280 and the one or more (external) speakers 285 or 290 of system 200 in FIG. 2A are otherwise similar, if not identical, to the computing system 105*a* or 105*b*, the one or more main display devices 115, the one or more user devices 120, and the one or more audio playback devices 125*a*-125*n*, respectively, of system 100 in FIG. 1, and the descriptions of these components of system 100 are applicable to the corresponding components of system 200, respectively.

Turning to the non-limiting embodiment of FIG. 2B, in some embodiments, system 200' might be similar to system 200 of FIG. 2A, except that system 200' might function without the use of a computing system 205 to perform processing functions and to communicate with each of the main display device(s) 225 and the user device(s) 255. Rather, system 200' might comprise the one or more main display devices 225 (which might correspond to the one or more main display devices 115 of system 100 of FIG. 1, or the like), each of which might include, without limitation, one or more processors 230, one or more data stores 235, one or more communications transceivers 240, one or more display screens 245, and (optionally) one or more (built-in) speakers 250, and/or the like. System 200' might further comprise the one or more user devices 255 (which might correspond to the one or more user devices 120 of system 100 of FIG. 1, or the like), each of which might include, but are not limited to, one or more processors 260, one or more data stores 265, one or more communications transceivers 270, one or more display screens 275, and (optionally) one or more (built-in) speakers 280, and/or the like. In some cases, system 200 might further comprise the one or more external speakers 285 (which might communicatively couple either wirelessly or in a wired manner with at least one of the main display devices 225 (in some instances, via communications transceivers 240)) and the one or more external speakers 290 (which might communicatively couple either wirelessly or in a wired manner with at least one of the user devices 255 (in some instances, via communications transceivers 270)), and/or the like. At least one main display device 225 might communicatively couple (either via wireless or wired connection) with at least one user device 255 (in some cases, via communications transceivers 240 and 270).

The one or more main display devices 225, the one or more user devices 255, and the one or more (internal) speakers 250 or 280 and the one or more (external) speakers 285 or 290 of system 200' in FIG. 2B are otherwise similar, if not identical, to the one or more main display devices 225, the one or more user devices 255, and the one or more (internal) speakers 250 or 280 and the one or more (external) speakers 285 or 290, respectively, of system 200 in FIG. 2A, and the descriptions of these components of system 200 are applicable to the corresponding components of system 200', respectively.

Figure 3A:
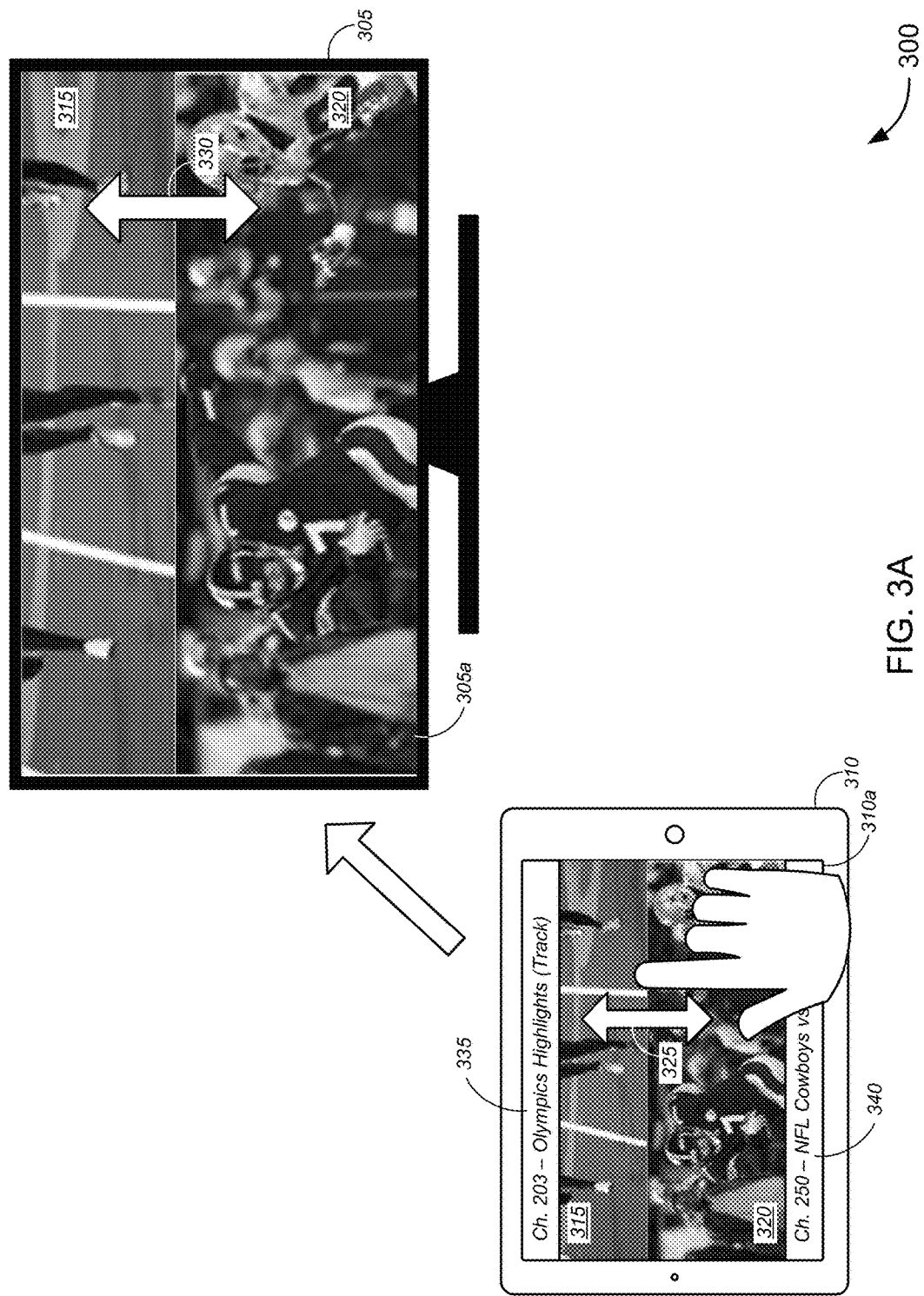
FIGS. 3A-3G are flow diagrams illustrating various embodiments of user interfaces and display screens during implementation of content navigation or selection using touch-based input.
Figure 3B:
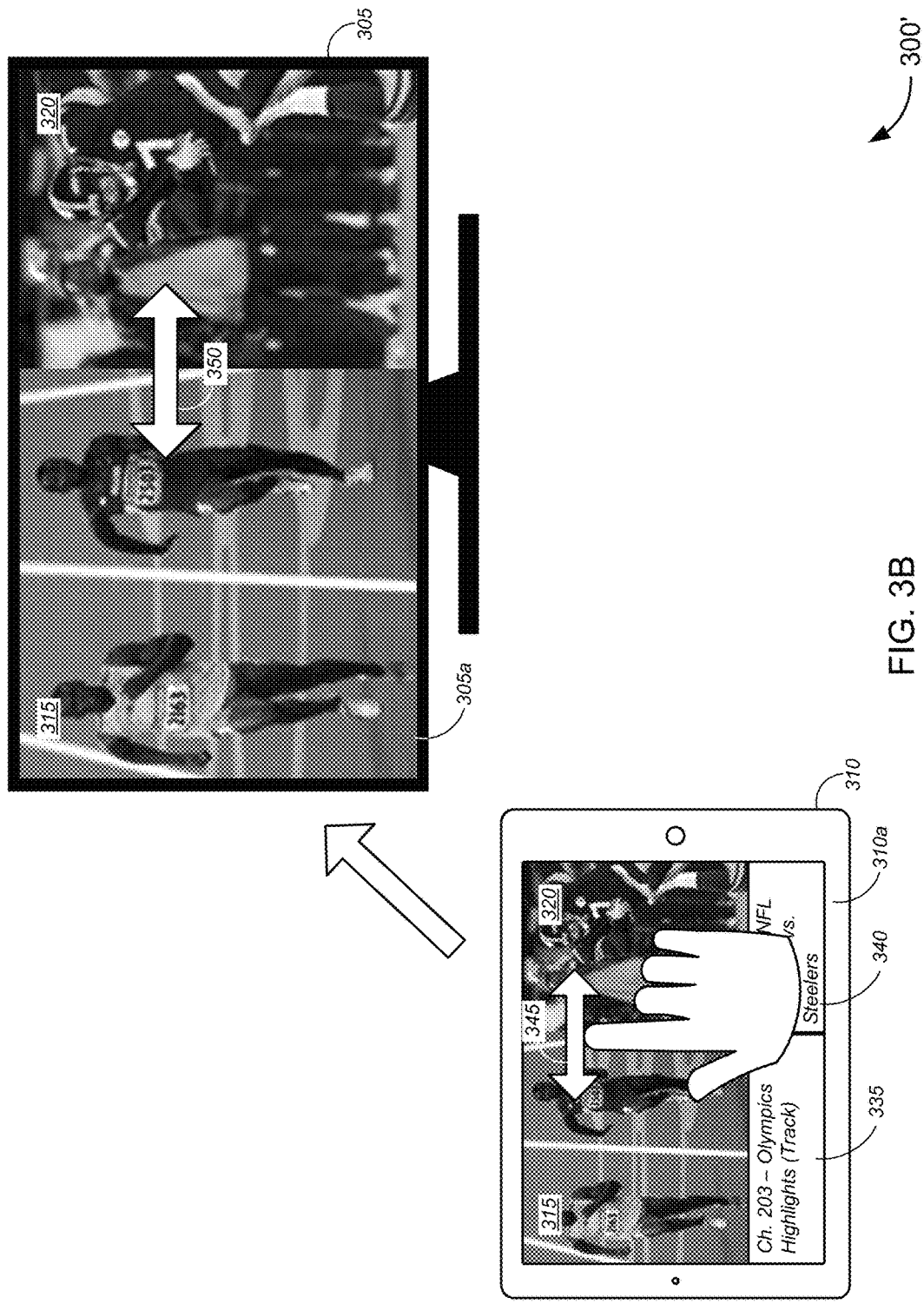
Figure 3C:
Figure 3D:
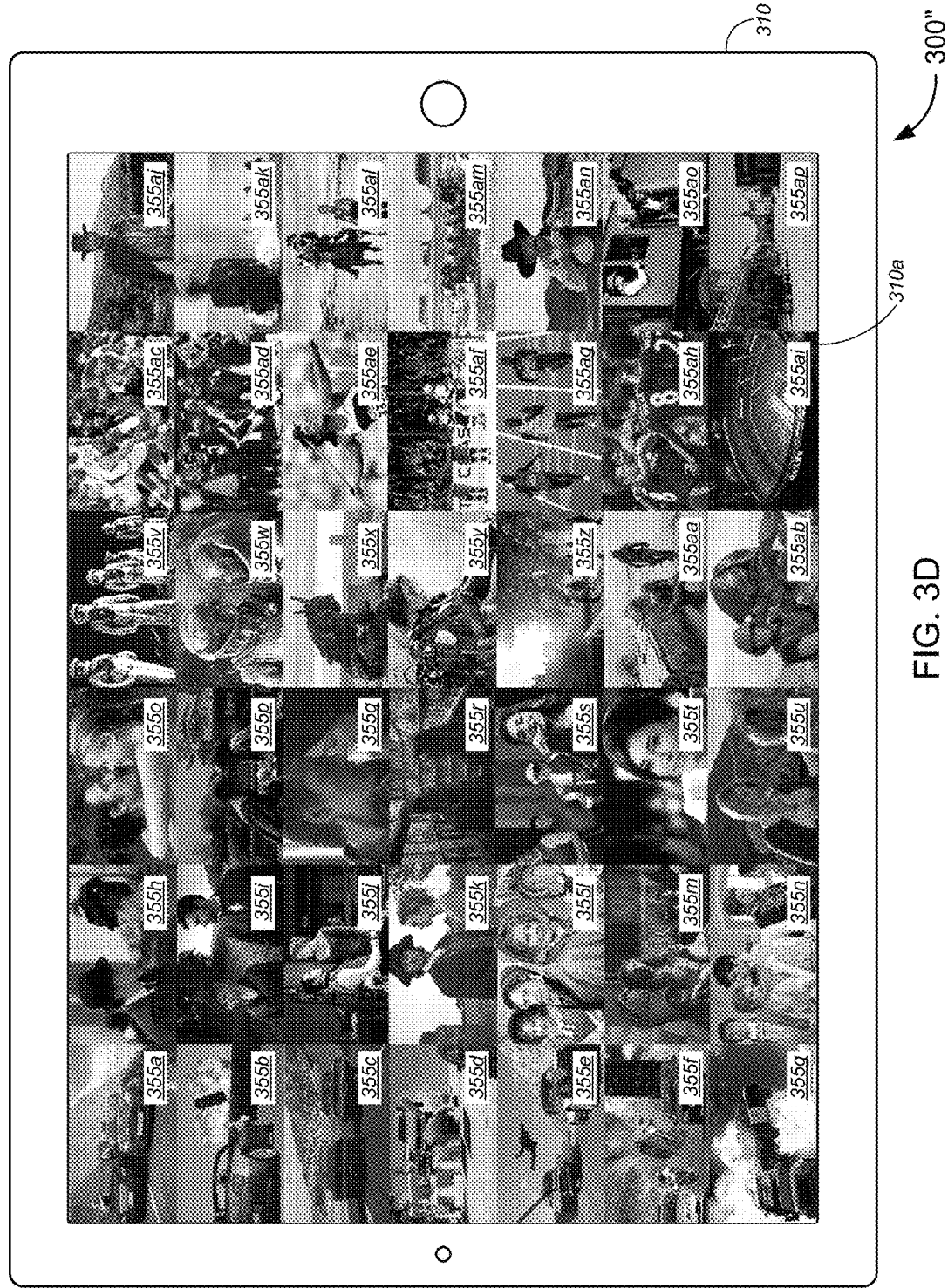
Figure 3E:
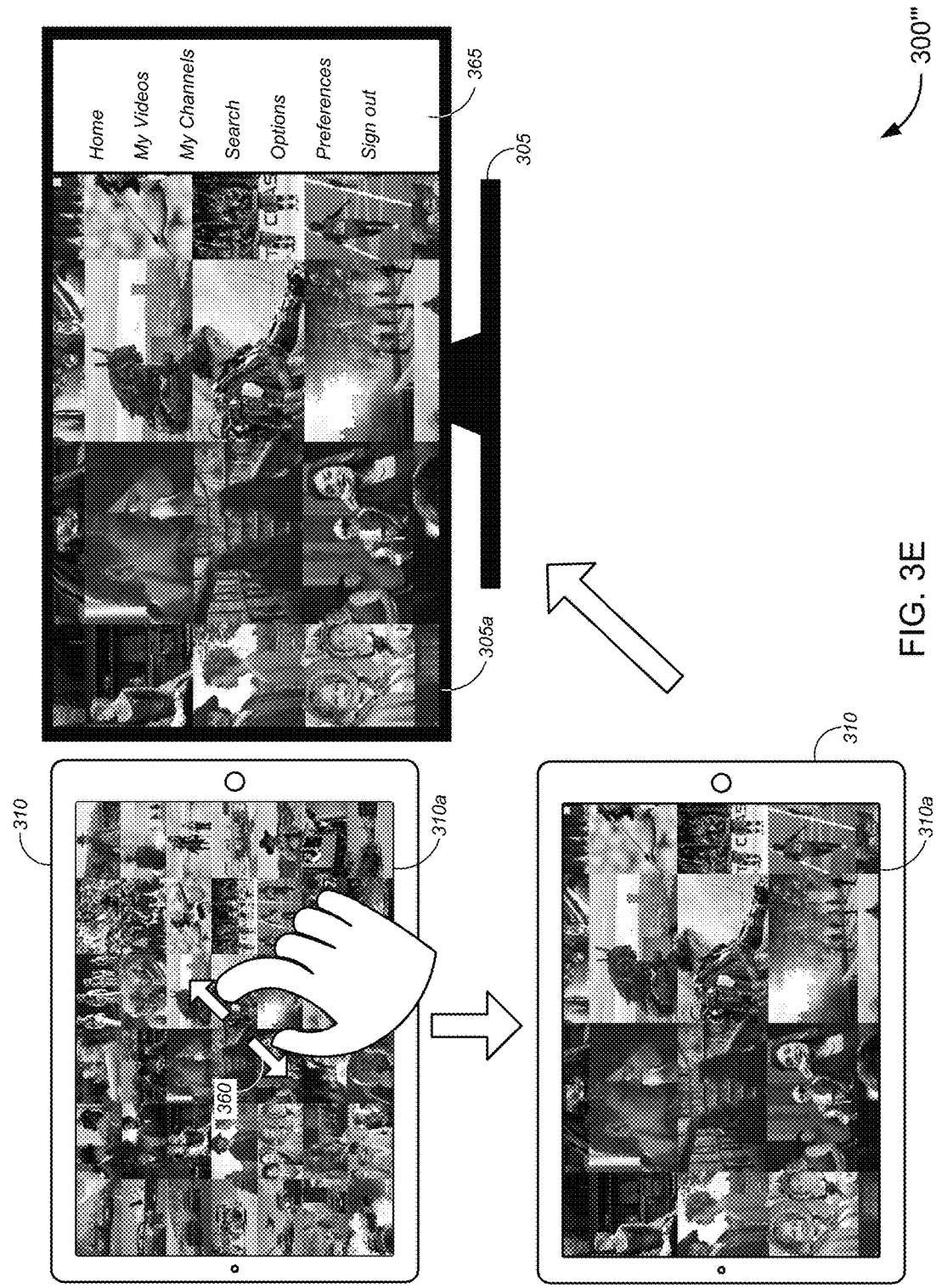
Figure 3F:
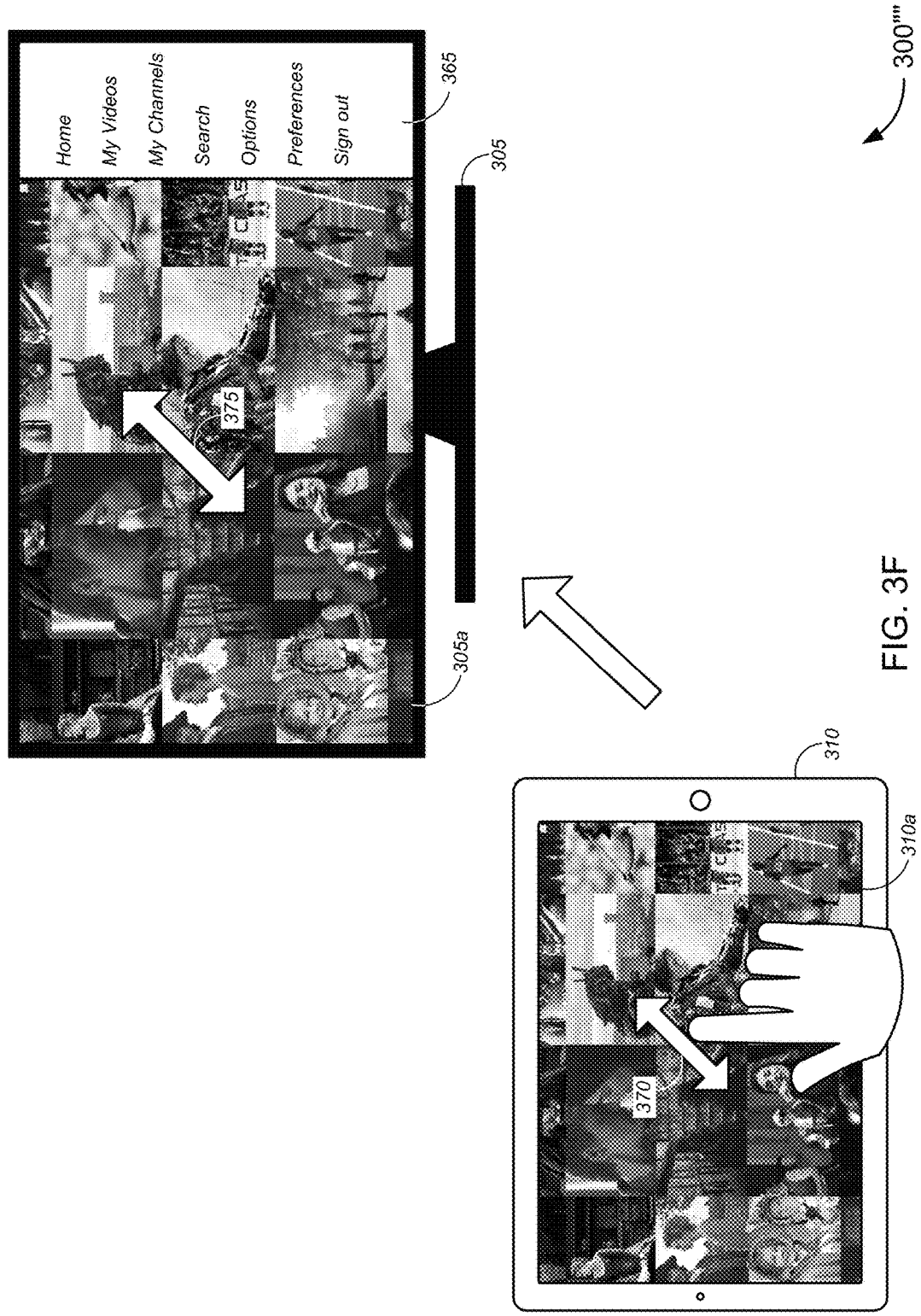

FIGS. 3A-3G (collectively, "FIG. 3") are flow diagrams illustrating various embodiments 300, 300', 300", 300''', 300'''', and 300''''' of user interfaces and display screens during implementation of content navigation or selection using touch-based input. Embodiment 300 of FIG. 3A depicts vertical shifting of video content, and embodiment 300' of FIG. 3B depicts horizontal shifting of video content, while embodiment 300''' of FIG. 3E depicts zooming of a plurality of video content that are arranged in a grid pattern, and embodiment 300'''' of FIG. 3F depicts diagonal shifting of a plurality of video content that are arranged in a grid pattern (at its current level of zoom), while embodiment 300''''' depicts pop-up window in response to selection of one of the video content in the plurality of video content that are arranged in a grid pattern. FIGS. 3C-3G are directed to embodiments that display a plurality of video content in a grid pattern.

In FIG. 3, main display device 305 (which might correspond to main display devices 115 and 225 of FIGS. 1 and 2, or the like) might comprise display screen 305*a* (which might correspond to display screens 115*a* and 245 of FIGS. 1 and 2, or the like). Likewise, in FIG. 3, user device 310 (which might correspond to user devices 120 and 255 of FIGS. 1 and 2, or the like) might comprise touchscreen display or touchscreen display device 310*a* (which might correspond to display screens 120*a* and 275 of FIGS. 1 and 2, or the like).

With reference to FIGS. 3A and 3B, a first video content 315 might be displayed on the display screen 305*a* (or at least a portion of the display screen 305*a*) of the main display device 305 (which, in this particular embodiment, is a television, but is not limited to such). The display of the first video content 315 on the at least a portion of the display screen 305*a* might be mirrored on at least a portion of the touchscreen display 310*a* (in some cases, in real time (or near real time)). To change the channel or to change to a different video content (such as a second video content 320), the user might interact with the touchscreen display 310*a* of the user device 310 (which, in this particular embodiment, is a tablet computer, but is not limited to such).

In the embodiment 300 of FIG. 3A, the user might swipe along a vertical direction relative to a reference point on the touchscreen display 310*a* or relative to a viewing orientation (in this case, swiping upward to replace the first video content 315 with the second video content 320, or swiping downward to replace the second video content 320 with the first video content 315), as shown by the double arrow 325 (which herein might also refer to the direction along which the user swipes). In response to the user swiping along the vertical direction (or in response to the user device (and/or a computing system) receiving the touch-based user input (i.e., the swipe) via the touchscreen display 310a), the user device 310 and/or the computing system (which might correspond to the computing system 105a, 105b, or 205 of FIGS. 1 and 2A, or the like) might shift display of the first video content 315 along the vertical direction on the at least a portion of the touchscreen display 310a while displaying and shifting display of the second video content 320 along the vertical direction on the at least a portion of the touchscreen display 310a such that the first video content 315 and the second video content are adjacent to, or side-by-side with, each other while display of the first video content 315 and the second video content are being shifted. The shifting of the display of each of the first video content or the second video content, according to some embodiments, might include, without limitation, one of a scrolling effect, a sliding effect, a flipping effect, a transitioning effect, or a dragging effect, and/or the like. Alternatively, or additionally, the shifting of the display of each of the first video content or the second video content might comprise dynamic cropping of each of the first video content or the second video content such that the first video content and the second video content maintain their display resolution and size while both are being partially displayed during shifting.

While the displayed video content are being shifted, the user device 310 and the main display device 305 might remain in (wireless or wired) communication with each other, and the main display device 305 and/or the computing system might mirror (in some cases, in real time (or near real time)) the display and the shifting of the display of the first video content 315 and the second video content 320 on the at least a portion of the display screen 305a of the main display device 305, with the first video content 315 and the second video content 320 shifting along the vertical direction, as shown by the double arrow 330. Throughout the shifting, rather than still (or static) images or paused video playback, each of the first video content 315 and the second video content 320 would continue playback or continue being presented to the user.

In terms of the audio presentation, the audio content corresponding to the one of the first video content 315 or the second video content 320 that fills the majority (in this case more than 50%) of the at least a portion of the touchscreen display 310a or the at least a portion of the display screen 305a would be presented or would continue to be presented through audio playback devices (which might correspond to audio playback devices or speakers 125a-125n, 250, 280, 285, and/or 290 of FIGS. 1 and 2, or the like). For example, prior to (and after) the user swiping along the vertical direction 325, the video content (i.e., one of the first video content 315 or the second video content 320) being displayed would fill 100% of each of the at least a portion of touchscreen display 310a and the at least a portion of the display screen 305a, and thus the audio content corresponding to such video content would be presented through the audio playback device(s). During shifting from the first video content 315 to the second video content 320, while the first video content 315 fills at least 50% of the at least a portion of the touchscreen display 310a or the at least a portion of the display screen 305a, the audio content corresponding to the first video content 315 would continue to be presented. As the second video content 320 begins to fill more than 50%, the audio content corresponding to the second video content 320 would replace the audio content corresponding to the first video content 315 (referred to herein as the "audio shift") as the audio content being presented through the audio playback device(s).

Alternatively, the audio content corresponding to the one of the first video content 315 or the second video content 320 that covers a center position of the at least a portion of the touchscreen display 310a or the at least a portion of the display screen 305a would be presented or would continue to be presented through audio playback devices (which might correspond to audio playback devices or speakers 125a-125n, 250, 280, 285, and/or 290 of FIGS. 1 and 2, or the like). For example, prior to (and after) the user swiping along the vertical direction 325, the video content (i.e., one of the first video content 315 or the second video content 320) being displayed would cover a center position of each of the at least a portion of touchscreen display 310a and the at least a portion of the display screen 305a, and thus the audio content corresponding to such video content would be presented through the audio playback device(s). During shifting from the first video content 315 to the second video content 320, while the first video content 315 covers the center position of the at least a portion of the touchscreen display 310a or the at least a portion of the display screen 305a, the audio content corresponding to the first video content 315 would continue to be presented. As the second video content 320 begins to replace the first video content in terms of covering the center position of the at least a portion of the touchscreen display 310a or the at least a portion of the display screen 305a, the audio content corresponding to the second video content 320 would replace the audio content corresponding to the first video content 315 (also referred to herein as the "audio shift") as the audio content being presented through the audio playback device(s).

In some embodiments, the audio shift (or the transition of the audio playback), whether based on the amount of whichever video content fills the majority of the at least a portion of the touchscreen display 310a or of the display screen 305a or based on which video content covers a center position of the at least a portion of the touchscreen display 310a or of the display screen 305a, may be as described in detail in the '812 application, which has already been incorporated herein by reference in its entirety for all purposes. Other audio shifting may alternatively be implemented as necessary or as desired.

According to some embodiments, such as shown in the non-limiting example of embodiment 300 of FIG. 3A, the touchscreen display 310a might comprise a first sub-section 335 containing content information (including, but not limited to, one or more of channel or stream information, title or name of video content, brief description of video content, information regarding actors, directors, production crew, studio, or persons of interest associated with the video content, length of video content, remaining length of video content playback, trailers, related content (e.g., prequels, sequels, other episodes in earlier seasons, other episodes in current season, other episodes in later seasons, etc.), filming locations, still pictures associated with the video content, trivia, and/or the like) associated with the first video content 315 and/or a second sub-section 340 containing content information (including, but not limited to, one or more of channel or stream information, title or name of video content, brief description of video content, information regarding actors, directors, production crew, studio, or persons of interest associated with the video content, length of video content, remaining length of video content playback, trailers, related content (e.g., prequels, sequels, other episodes in earlier seasons, other episodes in current season, other episodes in later seasons, etc.), filming locations, still pictures associated with the video content, trivia, and/or the like) associated with the second video content 320. Although each of the first sub-section 335 and the second sub-section 340 are depicted in FIG. 3A as being displayed in separate portions of the touchscreen display 310a on which neither the first video content 315 nor the second video content 320 are being displayed, the various embodiments are not so limited, and at least one of the first sub-section 335 and the second sub-section 340 might be displayed as being overlaid over corresponding at least one of the first video content 315 or the second video content 320. Further, although each of the first sub-section 335 and the second sub-section 340 are depicted in FIG. 3A as being displayed along the top or bottom edges of the touchscreen display 310a (on which neither the first video content 315 nor the second video content 320 are being displayed), the various embodiments are not so limited, and at least one of the first sub-section 335 and the second sub-section 340 might be displayed along the side edge(s) of the touchscreen display 310a.

In the embodiment 300' of FIG. 3B, the user might swipe along a horizontal direction relative to a reference point on the touchscreen display 310a or relative to a viewing orientation (in this case, swiping to the left to replace the first video content 315 with the second video content 320, or swiping to the right to replace the second video content 320 with the first video content 315), as shown by the double arrow 345 (which herein might also refer to the direction along which the user swipes). In response to the user swiping along the horizontal direction (or in response to the user device (and/or a computing system) receiving the touch-based user input (i.e., the swipe) via the touchscreen display 310a), the user device 310 and/or the computing system (which might correspond to the computing system 105a, 105b, or 205 of FIGS. 1 and 2A, or the like) might shift display of the first video content 315 along the horizontal direction on the at least a portion of the touchscreen display 310a while displaying and shifting display of the second video content 320 along the horizontal direction on the at least a portion of the touchscreen display 310a such that the first video content 315 and the second video content are adjacent to, or side-by-side with, each other while display of the first video content 315 and the second video content are being shifted. The shifting of the display of each of the first video content or the second video content, according to some embodiments, might include, without limitation, one of a scrolling effect, a sliding effect, a flipping effect, a transitioning effect, or a dragging effect, and/or the like. Alternatively, or additionally, the shifting of the display of each of the first video content or the second video content might comprise dynamic cropping of each of the first video content or the second video content such that the first video content and the second video content maintain their display resolution and size while both are being partially displayed during shifting.

While the displayed video content are being shifted, the user device 310 and the main display device 305 might remain in (wireless or wired) communication with each other, and the main display device 305 and/or the computing system might mirror (in some cases, in real time (or near real time)) the display and the shifting of the display of the first video content 315 and the second video content 320 on the at least a portion of the display screen 305a of the main display device 305, with the first video content 315 and the second video content 320 shifting along the horizontal direction, as shown by the double arrow 350. Throughout the shifting, as with the embodiment 300 of FIG. 3A, rather than still (or static) images or paused video playback, each of the first video content 315 and the second video content 320 would continue playback or continue being presented to the user.

In terms of the audio presentation, as with the embodiment 300 of FIG. 3A, the audio content corresponding to the one of the first video content 315 or the second video content 320 that fills the majority (in this case more than 50%) of the at least a portion of the touchscreen display 310a or the at least a portion of the display screen 305a would be presented or would continue to be presented through audio playback devices (which might correspond to audio playback devices or speakers 125a-125n, 250, 280, 285, and/or 290 of FIGS. 1 and 2, or the like). For example, prior to (and after) the user swiping along the horizontal direction 345, the video content (i.e., one of the first video content 315 or the second video content 320) being displayed would fill 100% of each of the at least a portion of touchscreen display 310a and the at least a portion of the display screen 305a, and thus the audio content corresponding to such video content would be presented through the audio playback device(s). During shifting from the first video content 315 to the second video content 320, while the first video content 315 fills at least 50% of the at least a portion of the touchscreen display 310a or the at least a portion of the display screen 305a, the audio content corresponding to the first video content 315 would continue to be presented. As the second video content 320 begins to fill more than 50%, the audio content corresponding to the second video content 320 would replace the audio content corresponding to the first video content 315 (referred to herein as the "audio shift") as the audio content being presented through the audio playback device(s).

Alternatively, the audio content corresponding to the one of the first video content 315 or the second video content 320 that covers a center position of the at least a portion of the touchscreen display 310a or the at least a portion of the display screen 305a would be presented or would continue to be presented through audio playback devices (which might correspond to audio playback devices or speakers 125a-125n, 250, 280, 285, and/or 290 of FIGS. 1 and 2, or the like). For example, prior to (and after) the user swiping along the horizontal direction 345, the video content (i.e., one of the first video content 315 or the second video content 320) being displayed would cover a center position of each of the at least a portion of touchscreen display 310a and the at least a portion of the display screen 305a, and thus the audio content corresponding to such video content would be presented through the audio playback device(s). During shifting from the first video content 315 to the second video content 320, while the first video content 315 covers the center position of the at least a portion of the touchscreen display 310a or the at least a portion of the display screen 305a, the audio content corresponding to the first video content 315 would continue to be presented. As the second video content 320 begins to replace the first video content in terms of covering the center position of the at least a portion of the touchscreen display 310a or the at least a portion of the display screen 305a, the audio content corresponding to the second video content 320 would replace the audio content corresponding to the first video content 315 (also referred to herein as the "audio shift") as the audio content being presented through the audio playback device(s).

In some embodiments, the audio shift (or the transition of the audio playback), whether based on the amount of whichever video content fills the majority of the at least a portion of the touchscreen display 310a or of the display screen 305a or based on which video content covers a center position of the at least a portion of the touchscreen display 310a or of the display screen 305a, may be as described in detail in the '812 application, which has already been incorporated herein by reference in its entirety for all purposes. Other audio shifting may alternatively be implemented as necessary or as desired.

According to some embodiments, such as shown in the non-limiting example of embodiment 300' of FIG. 3B, the touchscreen display 310a might comprise a first sub-section 335 containing content information (including, but not limited to, one or more of channel or stream information, title or name of video content, brief description of video content, information regarding actors, directors, production crew, studio, or persons of interest associated with the video content, length of video content, remaining length of video content playback, trailers, related content (e.g., prequels, sequels, other episodes in earlier seasons, other episodes in current season, other episodes in later seasons, etc.), filming locations, still pictures associated with the video content, trivia, and/or the like) associated with the first video content 315 and/or a second sub-section 340 containing content information (including, but not limited to, one or more of channel or stream information, title or name of video content, brief description of video content, information regarding actors, directors, production crew, studio, or persons of interest associated with the video content, length of video content, remaining length of video content playback, trailers, related content (e.g., prequels, sequels, other episodes in earlier seasons, other episodes in current season, other episodes in later seasons, etc.), filming locations, still pictures associated with the video content, trivia, and/or the like) associated with the second video content 320. Although each of the first sub-section 335 and the second sub-section 340 are depicted in FIG. 3B as being displayed in separate portions of the touchscreen display 310a on which neither the first video content 315 nor the second video content 320 are being displayed, the various embodiments are not so limited, and at least one of the first sub-section 335 and the second sub-section 340 might be displayed as being overlaid over corresponding at least one of the first video content 315 or the second video content 320. Further, although each of the first sub-section 335 and the second sub-section 340 are depicted in FIG. 3A as being displayed along the bottom edge of the touchscreen display 310a (on which neither the first video content 315 nor the second video content 320 are being displayed), the various embodiments are not so limited, and at least one of the first sub-section 335 and the second sub-section 340 might be displayed along the top edge or along the side edge(s) of the touchscreen display 310a.

We now turn to FIG. 3C, which depicts a plurality of video content 355a-355ap (collectively, "video content 355" or "plurality of video content 355" or the like) that are arranged or grouped into genre or categories, including, but not limited to, action, drama, romance, science fiction (or sci-fi), sports, western, and/or the like. For instance, video content 355a-355g fall under the action category, video content 355h-355n fall under the drama category, video content 355o-355u fall under the romance category, video content 355v-355ab fall under the sci-fi category, video content 355ac-355ai fall under the sports category, video content 355aj-355ap fall under the western category, and so on. The plurality of video content 355a-355ap may be displayed in a grid pattern while maintaining the category groupings, e.g., as shown in embodiment 300" of FIG. 3D.

In the non-limiting embodiment 300" of FIG. 3D, which depicts the plurality of video content 355 being displayed in the grid pattern in the at least a portion of the touchscreen 310a of user device 310, the columns of the grid might represent the categories or genre of video content while the rows of the grid might contain video content that fall under each category. For instance, as shown in FIG. 3D, video content 355a-355g falling under the action category might be displayed within a first column, video content 355h-355n falling under the drama category might be displayed within a second column, video content 355o-355u falling under the romance category might be displayed within a third column, video content 355v-355ab falling under the sci-fi category might be displayed within a fourth column, video content 355ac-355ai falling under the sports category might be displayed within a fifth column, video content 355aj-355ap falling under the western category might be displayed within a sixth column, and so on. Alternatively, although not shown, the rows of the grid might represent the categories or genre of video content while the columns of the grid might contain video content that fall under each category. In such a case, video content 355a-355g falling under the action category might be displayed within a first row, video content 355h-355n falling under the drama category might be displayed within a second row, video content 355o-355u falling under the romance category might be displayed within a third row, video content 355v-355ab falling under the sci-fi category might be displayed within a fourth row, video content 355ac-355ai falling under the sports category might be displayed within a fifth row, video content 355aj-355ap falling under the western category might be displayed within a sixth row, and so on. Throughout the display of the grid of video content 355, rather than still (or static) images or paused video playback, each of the plurality of video content 355 would continue playback or continue being presented to the user.

With reference to embodiment 300''' of FIG. 3E, the user can zoom in on the grid of video content of embodiment 300'' using, e.g., multi-finger touch input (including, without limitation, a two-finger pinch-out input on the touchscreen display 310a, as shown by the arrows 360). In response to the zoom-in or pinch-out input, the user device 310 and/or the computing system might expand the size of the video content in the grid (while maintaining the relative orientation of each video content with respect to adjust content), while cropping the portions of the video content that would exceed the boundaries of the touchscreen display 310a (or the at least a portion of the touchscreen display 310a). Such dynamic cropping is similar to the dynamic cropping as described above with respect to FIGS. 3A and 3B. In some embodiments, the position in the middle of the two fingers might mark the center of the grid after zooming in. In other words, if the center between the user's fingers are near the bottom-left corner of the at least a portion of the touchscreen display 310a (for example) when the user uses the two-finger pinch-out input, the grid of video content would expand as described above, with the video content or group of video content that were at the center between the user's fingers being centered on the at least a portion of the touchscreen display 310a during or after zoom-in. If necessary, vertical or horizontal shifting as described above with respect to embodiments 300 and 300' of FIGS. 3A and 3B may be implemented during the zooming process.

As described above, while the displayed video content are being zoomed in and perhaps also shifted, the user device 310 and the main display device 305 might remain in (wireless or wired) communication with each other, and the main display device 305 and/or the computing system might mirror (in some cases, in real time (or near real time)) the zooming in (and in some cases, display and the shifting of the display as well) of the plurality of video content 355 on the at least a portion of the display screen 305a of the main display device 305. Throughout the zooming in (and perhaps also shifting), rather than still (or static) images or paused video playback, each of the plurality of video content 355 would continue playback or continue being presented to the user. In some embodiments, a menu section 365 might be displayed in at least one of a portion of touchscreen display 310a or a portion of the display screen 305a. Merely by way of example, the menu section 365 might provide the user with options to return to a home screen (i.e., "Home" command), to display the user's compilation of videos or favorite videos (i.e., "My Videos" command), to display the user's compilation of channels or favorite channels (i.e., "My Channels" command), to search for video content (i.e., the "Search" command), to view or change viewing or display settings or options (i.e., "Options" command), to view or change user preferences with regard to video content, display of video content, display of content information, and/or settings, etc. (i.e., "Preferences" command), to sign out or log out of the video playback or streaming account (i.e., "Sign out" command), and/or the like. Although shown on the right edge of the display screen 305a, the menu section 365 may be displayed on any of the top edge, the left edge, or the bottom edge of the display screen 305a, or on any edge of the touchscreen display 310a, as desired or as preferred by the user or the video content service provider.

In terms of the audio presentation, the user might select one of the plurality of video content 355. In such a case, the audio content corresponding to the selected video content 355 might be presented to the user through the audio playback devices (which might correspond to audio playback devices or speakers 125a-125n, 250, 280, 285, and/or 290 of FIGS. 1 and 2, or the like). Alternatively, the audio content corresponding to the one of the plurality of video content 355 that covers a center position of the at least a portion of the touchscreen display 310a or the at least a portion of the display screen 305a would be presented or would continue to be presented through audio playback devices (which might correspond to audio playback devices or speakers 125a-125n, 250, 280, 285, and/or 290 of FIGS. 1 and 2, or the like). In some embodiments, the audio shift (or the transition of the audio playback), whether based on change in the selected video content or based on which video content covers a center position of the at least a portion of the touchscreen display 310a or of the display screen 305a, may be as described in detail in the '812 application, which has already been incorporated herein by reference in its entirety for all purposes. Other audio shifting may alternatively be implemented as necessary or as desired.

Although not shown, in a similar manner as above with respect to the zoom-in function, the user can zoom out to depict a larger collection of video content in a similar manner (e.g., using multi-finger touch input, including, but not limited to, a two-finger pinch or pinch-in input on the touchscreen display 310a, in directions opposite to the arrows 360). Such zoom-out function would otherwise be similar to the zoom-in function in terms of video display and audio presentation.

In the embodiment 300"" of FIG. 3F, the user might swipe along a diagonal direction relative to a reference point on the touchscreen display 310a or relative to a viewing orientation (in this case, swiping upward-right to shift display of the grid of video content 355 up and to the right while simultaneously cropping the top-most and right-most video content as they move beyond the boundaries of the touchscreen display 310a and displaying the bottom-most and left-most video content as they move within the boundaries of the touchscreen display 310a at the current levels of zoom, or swiping downward-left to shift display of the grid of video content 355 down and to the left while simultaneously cropping the bottom-most and left-most video content as they move beyond the boundaries of the touchscreen display 310a and displaying the top-most and right-most video content as they move within the boundaries of the touchscreen display 310a at the current levels of zoom), as shown by the double arrow 370 (which herein might also refer to the direction along which the user swipes). In response to the user swiping along the diagonal direction (or in response to the user device (and/or a computing system) receiving the touch-based user input (i.e., the swipe) via the touchscreen display 310a), the user device 310 and/or the computing system (which might correspond to the computing system 105a, 105b, or 205 of FIGS. 1 and 2A, or the like) might shift display of the plurality of video content 355 along the diagonal direction on the at least a portion of the touchscreen display 310a while cropping the video content as they move beyond the boundaries of the touchscreen display 310a and displaying the video content as they move within the boundaries of the touchscreen display 310a at the current levels of zoom. Such dynamic cropping is similar to the dynamic cropping as described above with respect to FIGS. 3A and 3B. The shifting of the display of the plurality of video content, according to some embodiments, might include, without limitation, one of a scrolling effect, a sliding effect, a flipping effect, a transitioning effect, or a dragging effect, and/or the like.

While the displayed video content are being shifted, the user device 310 and the main display device 305 might remain in (wireless or wired) communication with each other, and the main display device 305 and/or the computing system might mirror (in some cases, in real time (or near real time)) the display and the shifting of the display of the plurality of video content 355 on the at least a portion of the display screen 305a of the main display device 305, with the plurality of video content 355 shifting along the diagonal direction, as shown by the double arrow 375. Throughout the shifting, rather than still (or static) images or paused video playback, each of the plurality of video content 355 would continue playback or continue being presented to the user.

In a similar manner, the user might swipe in the other diagonal direction (i.e., orthogonal to the diagonal direction 370). In such a case, the user might swipe upward-left to shift display of the grid of video content 355 up and to the left while simultaneously cropping the top-most and left-most video content as they move beyond the boundaries of the touchscreen display 310a and displaying the bottom-most and right-most video content as they move within the boundaries of the touchscreen display 310a at the current levels of zoom, or might swiping downward-right to shift display of the grid of video content 355 down and to the right while simultaneously cropping the bottom-most and right-most video content as they move beyond the boundaries of the touchscreen display 310a and displaying the top-most and left-most video content as they move within the boundaries of the touchscreen display 310a at the current levels of zoom). The display and shifting would otherwise be similar to the display and shifting in response to the user swiping in the diagonal direction 370.

In terms of the audio presentation, the user might select one of the plurality of video content 355. In such a case, the audio content corresponding to the selected video content 355 might be presented to the user through the audio playback devices (which might correspond to audio playback devices or speakers 125a-125n, 250, 280, 285, and/or 290 of FIGS. 1 and 2, or the like). In some embodiments, no audio might be presented. Alternatively, the audio content corresponding to the one of the plurality of video content 355 that covers a center position of the at least a portion of the touchscreen display 310a or the at least a portion of the display screen 305a would be presented or would continue to be presented through audio playback devices (which might correspond to audio playback devices or speakers 125a-125n, 250, 280, 285, and/or 290 of FIGS. 1 and 2, or the like). In some embodiments, the audio shift (or the transition of the audio playback), whether based on change in the selected video content or based on which video content covers a center position of the at least a portion of the touchscreen display 310a or of the display screen 305a, may be as described in detail in the '812 application, which has already been incorporated herein by reference in its entirety for all purposes. Other audio shifting may alternatively be implemented as necessary or as desired.

Figure 3G:

With reference to non-limiting embodiment 300'''' of FIG. 3G, when a user selects on of the plurality of video content 355, a pop-up window 380 might be displayed overlaid over the plurality of video content 355 in the grid pattern (in its current level of zoom). The pop-up window 380 might display the selected video content 355 (in this case, video content 355l), which might continue playing within the pop-up window 380. Also displayed within the pop-up window 380 might be content information associated with the selected video content 355, including, without limitation, one or more of title or name of the selected video content, brief description of the selected video content, the channel or stream information, information regarding actors, directors, production crew, studio, or persons of interest associated with the selected video content, length of the selected video content, remaining length of the selected video content playback, trailers, related content (e.g., prequels, sequels, other episodes in earlier seasons, other episodes in current season, other episodes in later seasons, etc.), filming locations, still pictures associated with the video content, trivia, and/or the like.

Control information 385 might additionally be displayed within the pop-up window 380 to provide the user with some guidance in terms of how to interact with the pop-up window. For example, the control information 385 might include, but is not limited to, information or options for playing the selected video content 355, information or options for viewing or selecting other episodes or seasons/series if the selected video content is part of a series or the like, information or options for returning to the grid view or a previous pop-up window view, and/or the like. For example, the information or options for playing the selected video content 355 might include, without limitation, double tapping the selected video content 355 within the pop-up window 380, double tapping anywhere in the pop-up window 380, double tapping anywhere in the at least a portion of the touchscreen display 310a, double tapping anywhere in the touchscreen display 310a, single or double tapping a play icon(s) that is displayed in the pop-up window 380, single or double tapping a play icon(s) that is displayed in the at least a portion of the touchscreen display 310a outside the pop-up window 380, and/or the like.

In some cases, the information or options for viewing or selecting other episodes or seasons/series if the selected video content is part of a series or the like might include, but are not limited to, tapping a link to "all episodes" or "more episodes," swiping left or right, swiping up or down, swiping diagonally, zooming in or out of the portion of the pop-up window 380 displaying the selected video content, and/or the like. In some embodiments, the display of the selected video content 380 might be similar to the embodiments 300 and 300', in that a transitioning between two chronologically adjacent episodes might be performed and implemented in response to the user swiping along a vertical direction or swiping along a horizontal direction, with the episodes shifting in a similar manner as the shifting of video content described above with respect to FIGS. 3A and 3B. According to some embodiments, the episodes of the selected video content 355 might be arranged in a grid pattern, not unlike the embodiments 300'', 300''', and 300'''' of FIGS. 3D-3F, with the episodes belonging to particular seasons (or series in UK television) being arranged or grouped in columns, so that swiping horizontally would cause the shifting of episodes in one season to replace episodes in another season, and swiping vertically would cause the shifting of episodes within a single season, while swiping diagonally would cause the simultaneous shifting of seasons and episodes, and zooming out would cause the grid of seasons and episodes of the selected video content to be displayed, while zooming in would display one of the episodes in the selected season (here, the position of the user's fingers might determine which episode is selected, not unlike the centering of the zoomed grid as described above with respect to embodiment 300''' of FIG. 3E). Alternatively, the seasons or series might be arranged or grouped in rows instead of columns, and might otherwise function in a similar manner.

In some instances, the information or options for returning to the grid view or a previous pop-up window view might include, without limitation, tapping a "return" or "back" icon, tapping a "return" or "back" link, single tapping anywhere in the pop-up window 380, single tapping anywhere in the at least a portion of the touchscreen display 310a outside the pop-up window 380, and/or the like.

In terms of audio presentation, audio content associated with the episode that is displayed in the pop-up window 380 might be presented through the audio playback devices (which might correspond to audio playback devices or speakers 125a-125n, 250, 280, 285, and/or 290 of FIGS. 1 and 2, or the like). During shifting, the audio shifting as described above with respect to embodiments 300, 300', 300'', 300''', and 300'''' might be implemented. In the case where the grid of episodes is displayed in the pop-up window 380, the audio content the selected episode or the episode at the center position of the display portion of the pop-up window 380 might be presented through the audio playback devices, not unlike the audio playback or audio shifting as described above with respect to embodiment 300''' of FIG. 3E or embodiment 300'''' of FIG. 3F.

According to some embodiments, with respect to the swipe functionality as described above with respect to FIGS. 3A, 3B, and 3F, the user might be provided with fast swipe functionality (also referred to as "rapid swipe," "quick swipe," or the like), which allows for continuous and rapid shifting of multiple video content along a swipe direction (i.e., vertical as in embodiment 300 of FIG. 3A, horizontal as in embodiment 300' of FIG. 3B, diagonal as in embodiment 300'''' of FIG. 3F, or the like). In some cases, with the fast swipe functionality, the continuous and rapid shifting of the multiple video content might incorporate a virtual "frictional" component that slows the continuous shifting over time (not unlike a roulette wheel, a slot machine, or the like). Audible and/or visual effects might be added to support the notion of rapid and continuous shifting of multiple video content sources, including, without limitation, sound effects indicative of rapid video shifting, the slowing down of the continuous shifting over time due to a virtual "frictional" component, and/or the like. Alternatively, or additionally, for the fast swipe functionality, a user might stop the continuous and rapid shifting via user input including a tap and hold input, or the like, that causes the shifting to stop with the video content under the user's finger being stopped at its position within the at least one of the touchscreen display of the user device or of the display screen of the main display device. In this way, a user can quickly browse through the plurality of video content or channels (in some cases, until the user closes in on the video content or channel of interest, then the user can slowly swipe to find and select the desired video content or channel).

Figure 4A:
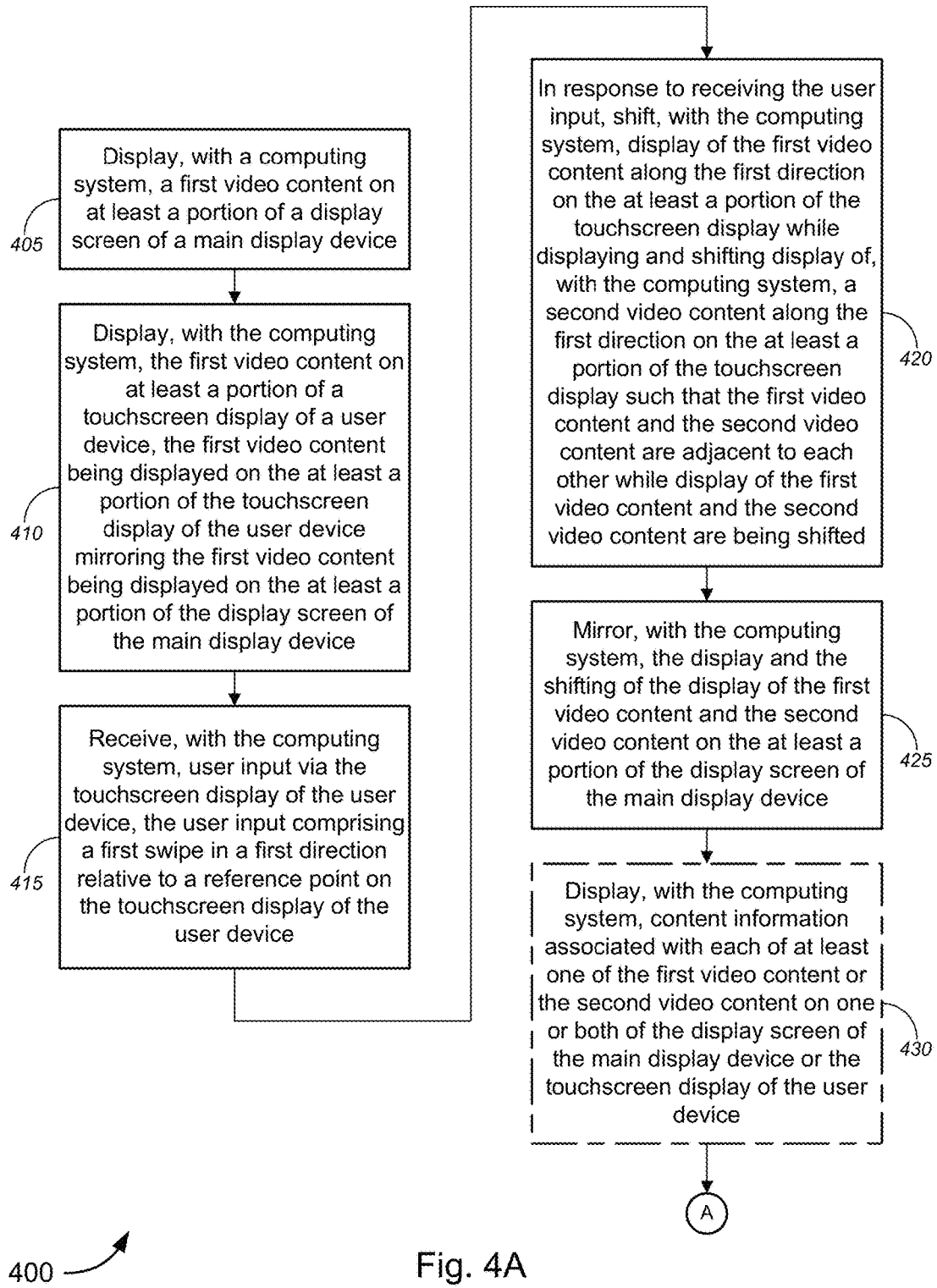
FIGS. 4A-4C are flow diagrams illustrating a method for implementing content navigation or selection using touch-based input, in accordance with various embodiments.
Figure 4B:
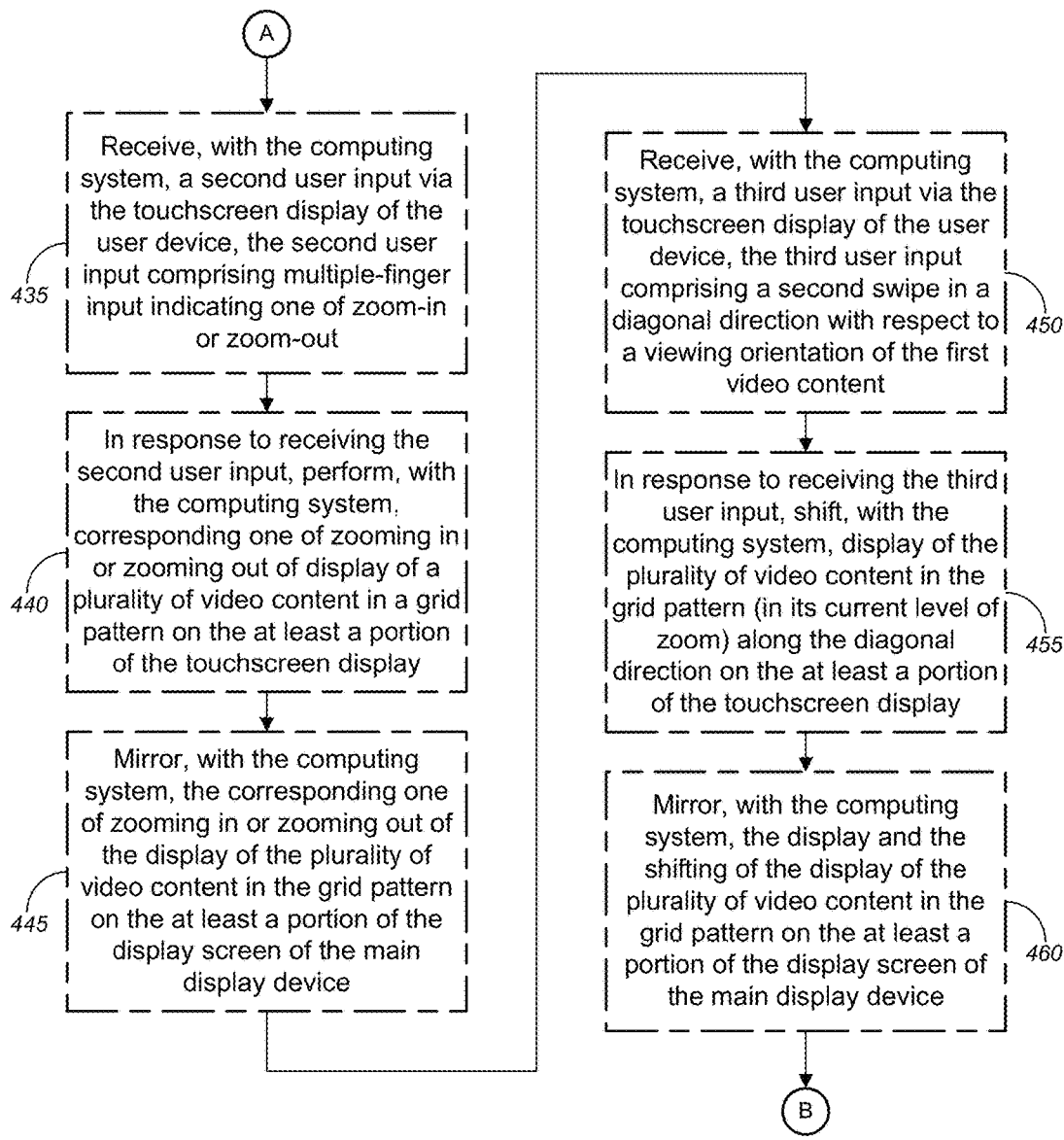
Figure 4C:
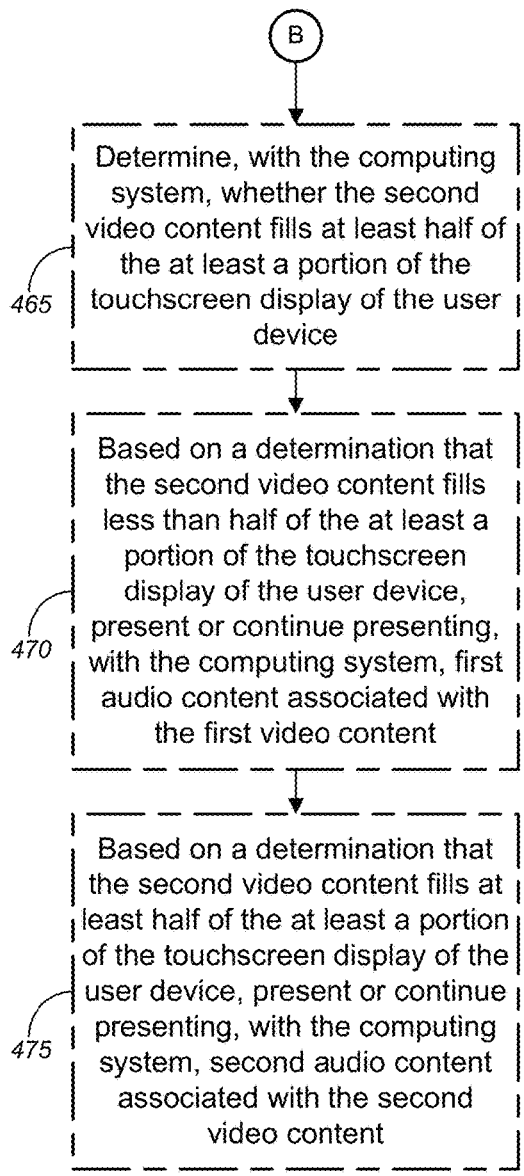

FIGS. 4A-4C (collectively, "FIG. 4") are flow diagrams illustrating a method 400 for implementing content navigation or selection using touch-based input, in accordance with various embodiments. Method 400 of FIG. 4A continues onto FIG. 4B following the circular marker denoted, "A," which continues onto FIG. 4C following the circular marker denoted, "B."

While the techniques and procedures are depicted and/or described in a certain order for purposes of illustration, it should be appreciated that certain procedures may be reordered and/or omitted within the scope of various embodiments. Moreover, while the method 400 illustrated by FIG. 4 can be implemented by or with (and, in some cases, are described below with respect to) the systems 100, 200, and 200' of FIGS. 1, 2A, and 2B, respectively (or components thereof), such methods may also be implemented using any suitable hardware (or software) implementation. Similarly, while each of the systems 100, 200, and 200' of FIGS. 1, 2A, and 2B, respectively (or components thereof), can operate according to the method 400 illustrated by FIG. 4 (e.g., by executing instructions embodied on a computer readable medium), the systems 100, 200, and 200' of FIGS. 1, 2A, and 2B can each also operate according to other modes of operation and/or perform other suitable procedures.

In the non-limiting embodiment of FIG. 4A, method 400, at block 405, displaying, with a computing system (which might correspond to computing systems 105a, 105b, and 205 of FIGS. 1 and 2A, or the like), a first video content on at least a portion of a display screen (which might correspond to display screen 115a, 245, and 305a of FIGS. 1, 2A, 2B, 3A, 3B, and 3D-3G, or the like) of a main display device (which might correspond to main display devices 115, 225, and 305 of FIGS. 1, 2A, 2B, 3A, 3B, and 3D-3G, or the like). At block 410, method 400 might comprise displaying, with the computing system, the first video content on at least a portion of a touchscreen display (which might correspond to touchscreen display 120a, 275, and 310a of FIGS. 1, 2A, 2B, 3A, 3B, and 3D-3G, or the like) of a user device (which might correspond to user devices 120, 255, and 310 of FIGS. 1, 2A, 2B, 3A, 3B, and 3D-3G, or the like), the first video content being displayed on the at least a portion of the touchscreen display of the user device mirroring the first video content being displayed on the at least a portion of the display screen of the main display device (in some cases, in real time (or near real time)).

Method 400 might further comprise receiving, with the computing system, user input via the touchscreen display of the user device, the user input comprising a first swipe in a first direction relative to a reference point on the touchscreen display of the user device (block 415) and, in response to receiving the user input, shifting, with the computing system, display of the first video content along the first direction on the at least a portion of the touchscreen display while displaying and shifting display of, with the computing system, a second video content along the first direction on the at least a portion of the touchscreen display such that the first video content and the second video content are adjacent to each other while display of the first video content and the second video content are being shifted (block 420). In some embodiments, the shifting of the display of each of the first video content or the second video content might comprise one of a scrolling effect, a sliding effect, a flipping effect, a transitioning effect, or a dragging effect, and/or the like. Alternatively, or additionally, the shifting of the display of each of the first video content or the second video content might comprise dynamic cropping of each of the first video content or the second video content such that the first video content and the second video content maintain their display resolution and size while both are being partially displayed during shifting. Method 400 might further comprise, at block 425, mirroring, with the computing system, the display and the shifting of the display of the first video content and the second video content on the at least a portion of the display screen of the main display device (in some cases, in real time (or near real time)).

At optional block 430, method 400 might comprise displaying, with the computing system, content information associated with each of at least one of the first video content or the second video content on one or both of the display screen of the main display device or the touchscreen display of the user device. The content information, in some embodiments, might include, but is not limited to, one or more of channel or stream information; title or name of video content; brief description of video content; information regarding actors, directors, production crew, studio, or persons of interest associated with the video content; length of video content; remaining length of video content playback; trailers; related content (e.g., prequels, sequels, other episodes in earlier seasons, other episodes in current season, other episodes in later seasons, etc.); filming locations; still pictures associated with the video content; trivia; and/or the like. In some cases, the content information might either displayed overlaid over corresponding at least one of the first video content or the second video content or displayed in a separate portion of the one or both of the display screen of the main display device or the touchscreen display of the user device on which neither the first video content nor the second video content are being displayed. Method 400 might continue onto the process at optional block 435 in FIG. 4B following the circular marker denoted, "A."

In some embodiments, the first video content and the second video content are video content among a plurality of video content that are arranged in a grid pattern with one video content being adjacent to four video content (as shown, e.g., in the embodiments of FIGS. 3D-3G or the like). With reference to FIG. 4B, method 400 might further comprise receiving, with the computing system, a second user input via the touchscreen display of the user device, the second user input comprising multiple-finger input indicating one of zoom-in or zoom-out (optional block 435), in response to receiving the second user input, performing, with the computing system, corresponding one of zooming in or zooming out of display of the plurality of video content in the grid pattern on the at least a portion of the touchscreen display (optional block 440), and mirroring, with the computing system, the corresponding one of zooming in or zooming out of the display of the plurality of video content in the grid pattern on the at least a portion of the display screen of the main display device (in some cases, in real time (or near real time)) (optional block 445).

In some cases, method 400 might further comprise receiving, with the computing system, a third user input via the touchscreen display of the user device, the third user input comprising a second swipe in a diagonal direction relative to a reference point on the touchscreen display of the user device (optional block 450), in response to receiving the third user input, shifting, with the computing system, display of the plurality of video content in the grid pattern (at its current level of zoom) along the diagonal direction on the at least a portion of the touchscreen display (optional block 455), and mirroring, with the computing system, the display and the shifting of the display of the plurality of video content in the grid pattern on the at least a portion of the display screen of the main display device (in some cases, in real time (or near real time)) (optional block 460), as shown, e.g., in the non-limiting embodiment of FIG. 3F, or the like. Method 400 might continue onto the process at optional block 465 in FIG. 4C following the circular marker denoted, "B."

At optional block 465 in FIG. 4C (following the circular marker denoted, "B"), and with reference to the non-limiting embodiments of FIGS. 3A and 3B (or the embodiment of FIG. 3F when zoomed in such that each video content when centered on the display screen substantially fills the display screen), method 400 might comprise determining, with the computing system, whether the second video content fills at least half (or, in the embodiments with the grid pattern diagonal shifting, whether the second video content fills the majority compared with the other three video content) of the at least a portion of the touchscreen display of the user device. Method 400, at optional block 470 might comprise, based on a determination that the second video content fills less than half (or, in the embodiments with the grid pattern diagonal shifting, fills less than the majority compared with the other three video content) of the at least a portion of the touchscreen display of the user device, presenting or continuing presenting, with the computing system, first audio content associated with the first video content (or the audio content associated the one of the other three video content that fills the majority compared with the second video content and the other two video content of the at least a portion of the touchscreen display of the user device) through one or more audio playback devices (which might correspond to audio playback devices 125a-125n, 285, and 290 of FIGS. 1, 2A, and 2B, or the like). Method 400 might further comprise, based on a determination that the second video content fills at least half (or, in the embodiments with the grid pattern diagonal shifting, fills the majority compared with the other three video content) of the at least a portion of the touchscreen display of the user device, presenting or continuing presenting, with the computing system, second audio content associated with the second video content (optional block 475) through the audio playback devices.

Further with respect to the embodiments with the grid pattern of video content (whether diagonal shifting, vertical shifting, horizontal shifting, or zooming in/out, or the like), although not shown in FIG. 4, the audio content that is presented is either the audio content corresponding to the video content that overlaps with at least one of the center of the at least a portion of the touchscreen display of the user device and/or the center of the at least a portion of the display screen of the main display device, or the audio content corresponding to the video content that has the largest proportion (compared with the one or more other video content) that is displayed in the at least a portion of the touchscreen display of the user device or the at least a portion of the display screen of the main display device. Alternatively, or additionally, although not shown in FIG. 4, the audio content that is presented is either audio content corresponding to a user-selected video content among two or more video content or audio content corresponding to video content that covers a center position of the display area of the at least a portion of the touchscreen display of the user device and/or the center of the at least a portion of the display screen of the main display device. According to some embodiments, the audio shift (or the transition of the audio playback) may be as described in detail in the '812 application, which has already been incorporated herein by reference in its entirety for all purposes.

In some embodiments, with reference to block 415 and/or optional block 450, and with respect to the swipe functionality as described above with respect to FIGS. 3A, 3B, and 3F, the user might be provided with fast swipe functionality (also referred to as "rapid swipe," "quick swipe," or the like), which allows for continuous and rapid shifting of multiple video content along a swipe direction (i.e., vertical as in embodiment 300 of FIG. 3A, horizontal as in embodiment 300' of FIG. 3B, diagonal as in embodiment 300"" of FIG. 3F, or the like). In some cases, with the fast swipe functionality, the continuous and rapid shifting of the multiple video content might incorporate a virtual "frictional" component that slows the continuous shifting over time (not unlike a roulette wheel, a slot machine, or the like). Audible and/or visual effects might be added to support the notion of rapid and continuous shifting of multiple video content sources, including, without limitation, sound effects indicative of rapid video shifting, the slowing down of the continuous shifting over time due to a virtual "frictional" component, and/or the like. Alternatively, or additionally, for the fast swipe functionality, a user might stop the continuous and rapid shifting via user input including a tap and hold input, or the like, that causes the shifting to stop with the video content under the user's finger being stopped at its position within the at least one of the touchscreen display of the user device or of the display screen of the main display device. In this way, a user can quickly browse through the plurality of video content or channels (in some cases, until the user closes in on the video content or channel of interest, then the user can slowly swipe to find and select the desired video content or channel).

Exemplary System and Hardware Implementation

Figure 5:
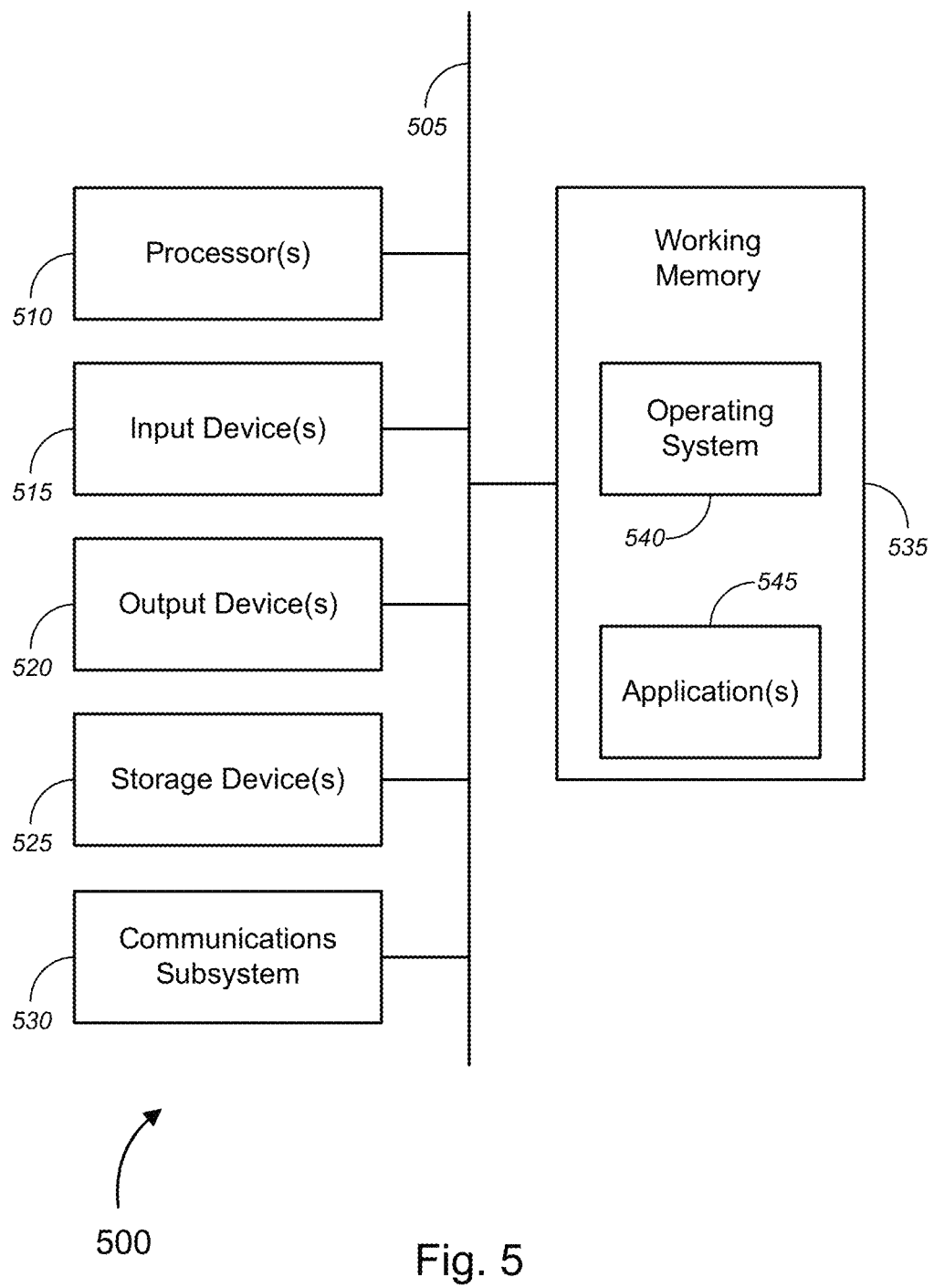
FIG. 5 is a block diagram illustrating an exemplary computer or system hardware architecture, in accordance with various embodiments.

FIG. 5 is a block diagram illustrating an exemplary computer or system hardware architecture, in accordance with various embodiments. FIG. 5 provides a schematic illustration of one embodiment of a computer system 500 of the service provider system hardware that can perform the methods provided by various other embodiments, as described herein, and/or can perform the functions of computer or hardware system (i.e., computing systems 105a, 105b, and 205, main display devices 115, 225, and 305, user devices 120, 255, and 310, audio playback devices 125a-125n, 285, and 290, video content sources (or servers) 135, etc.), as described above. It should be noted that FIG. 5 is meant only to provide a generalized illustration of various components, of which one or more (or none) of each may be utilized as appropriate. FIG. 5, therefore, broadly illustrates how individual system elements may be implemented in a relatively separated or relatively more integrated manner.

The computer or hardware system 500—which might represent an embodiment of the computer or hardware system (i.e., computing systems 105a, 105b, and 205, main display devices 115, 225, and 305, user devices 120, 255, and 310, audio playback devices 125*a*-125*n*, 285, and 290, video content sources (or servers) 135, etc.), described above with respect to FIGS. 1-4—is shown comprising hardware elements that can be electrically coupled via a bus 505 (or may otherwise be in communication, as appropriate). The hardware elements may include one or more processors 510, including, without limitation, one or more general-purpose processors and/or one or more special-purpose processors (such as microprocessors, digital signal processing chips, graphics acceleration processors, and/or the like); one or more input devices 515, which can include, without limitation, a mouse, a keyboard and/or the like; and one or more output devices 520, which can include, without limitation, a display device, a printer, and/or the like.

The computer or hardware system 500 may further include (and/or be in communication with) one or more storage devices 525, which can comprise, without limitation, local and/or network accessible storage, and/or can include, without limitation, a disk drive, a drive array, an optical storage device, solid-state storage device such as a random access memory ("RAM") and/or a read-only memory ("ROM"), and/or other forms of volatile and non-volatile storage, which can be programmable, flash-updateable and/or the like. Such storage devices may be configured to implement any appropriate data stores, including, without limitation, various file systems, database structures, and/or the like.

The computer or hardware system 500 might also include a communications subsystem 530, which can include, without limitation, a modem, a network card (wireless or wired), an infra-red communication device, a wireless communication device and/or chipset (such as a Bluetooth™ device, an 802.11 device, a WiFi device, a WiMax device, a WWAN device, cellular communication facilities, etc.), and/or the like. The communications subsystem 530 may permit data to be exchanged with a network (such as the network described below, to name one example), with other computer or hardware systems, and/or with any other devices described herein. In many embodiments, the computer or hardware system 500 will further comprise a working memory 535, which can include a RAM or ROM device, as described above.

The computer or hardware system 500 also may comprise software elements, shown as being currently located within the working memory 535, including an operating system 540, device drivers, executable libraries, and/or other code, such as one or more application programs 545, which may comprise computer programs provided by various embodiments (including, without limitation, hypervisors, VMs, and the like), and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be encoded and/or stored on a non-transitory computer readable storage medium, such as the storage device(s) 525 described above. In some cases, the storage medium might be incorporated within a computer system, such as the system 500. In other embodiments, the storage medium might be separate from a computer system (i.e., a removable medium, such as a compact disc, etc.), and/or provided in an installation package, such that the storage medium can be used to program, configure and/or adapt a general purpose computer with the instructions/code stored thereon. These instructions might take the form of executable code, which is executable by the computer or hardware system 500 and/or might take the form of source and/or installable code, which, upon compilation and/or installation on the computer or hardware system 500 (e.g., using any of a variety of generally available compilers, installation programs, compression/decompression utilities, etc.) then takes the form of executable code.

It will be apparent to those skilled in the art that substantial variations may be made in accordance with specific requirements. For example, customized hardware (such as programmable logic controllers, field-programmable gate arrays, application-specific integrated circuits, and/or the like) might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer or hardware system (such as the computer or hardware system 500) to perform methods in accordance with various embodiments of the invention. According to a set of embodiments, some or all of the procedures of such methods are performed by the computer or hardware system 500 in response to processor 510 executing one or more sequences of one or more instructions (which might be incorporated into the operating system 540 and/or other code, such as an application program 545) contained in the working memory 535. Such instructions may be read into the working memory 535 from another computer readable medium, such as one or more of the storage device(s) 525. Merely by way of example, execution of the sequences of instructions contained in the working memory 535 might cause the processor(s) 510 to perform one or more procedures of the methods described herein.

The terms "machine readable medium" and "computer readable medium," as used herein, refer to any medium that participates in providing data that causes a machine to operate in a specific fashion. In an embodiment implemented using the computer or hardware system 500, various computer readable media might be involved in providing instructions/code to processor(s) 510 for execution and/or might be used to store and/or carry such instructions/code (e.g., as signals). In many implementations, a computer readable medium is a non-transitory, physical, and/or tangible storage medium. In some embodiments, a computer readable medium may take many forms, including, but not limited to, non-volatile media, volatile media, or the like. Non-volatile media includes, for example, optical and/or magnetic disks, such as the storage device(s) 525. Volatile media includes, without limitation, dynamic memory, such as the working memory 535. In some alternative embodiments, a computer readable medium may take the form of transmission media, which includes, without limitation, coaxial cables, copper wire and fiber optics, including the wires that comprise the bus 505, as well as the various components of the communication subsystem 530 (and/or the media by which the communications subsystem 530 provides communication with other devices). In an alternative set of embodiments, transmission media can also take the form of waves (including without limitation radio, acoustic and/or light waves, such as those generated during radio-wave and infra-red data communications).

Common forms of physical and/or tangible computer readable media include, for example, a floppy disk, a flexible disk, a hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read instructions and/or code.

Various forms of computer readable media may be involved in carrying one or more sequences of one or more instructions to the processor(s) 510 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer or hardware system 500. These signals, which might be in the form of electromagnetic signals, acoustic signals, optical signals, and/or the like, are all examples of carrier waves on which instructions can be encoded, in accordance with various embodiments of the invention.

The communications subsystem 530 (and/or components thereof) generally will receive the signals, and the bus 505 then might carry the signals (and/or the data, instructions, etc. carried by the signals) to the working memory 535, from which the processor(s) 505 retrieves and executes the instructions. The instructions received by the working memory 535 may optionally be stored on a storage device 525 either before or after execution by the processor(s) 510.

Figure 6:
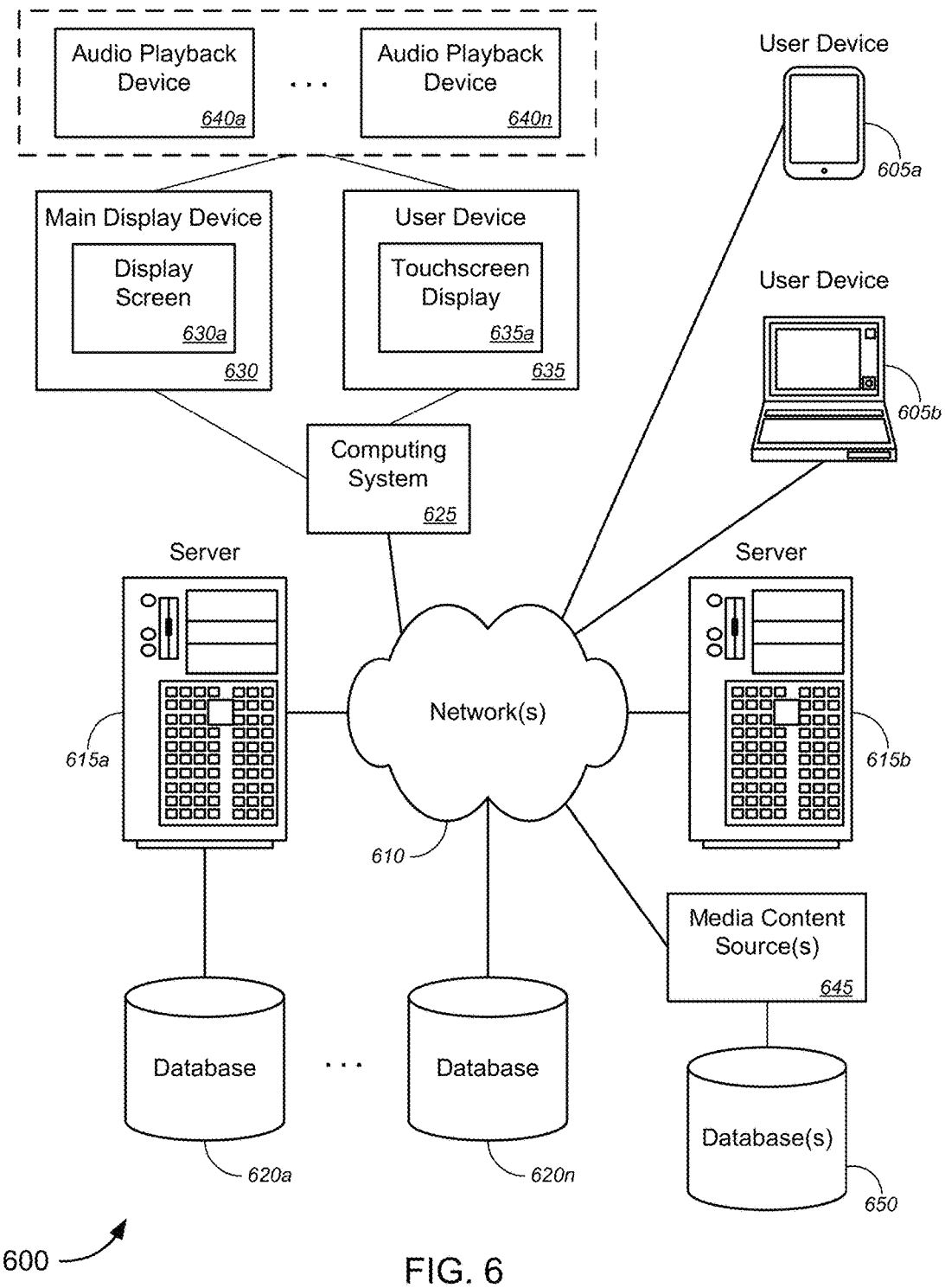
FIG. 6 is a block diagram illustrating a networked system of computers, computing systems, or system hardware architecture, which can be used in accordance with various embodiments.

As noted above, a set of embodiments comprises methods and systems for implementing media content streaming or playback, and, more particularly, to methods, systems, and apparatuses for implementing content navigation or selection using touch-based input. FIG. 6 illustrates a schematic diagram of a system 600 that can be used in accordance with one set of embodiments. The system 600 can include one or more user computers, user devices, or customer devices 605. A user computer, user device, or customer device 605 can be a general purpose personal computer (including, merely by way of example, desktop computers, tablet computers, laptop computers, handheld computers, and the like, running any appropriate operating system, several of which are available from vendors such as Apple, Microsoft Corp., and the like), cloud computing devices, a server(s), and/or a workstation computer(s) running any of a variety of commercially-available UNIX™ or UNIX-like operating systems. A user computer, user device, or customer device 605 can also have any of a variety of applications, including one or more applications configured to perform methods provided by various embodiments (as described above, for example), as well as one or more office applications, database client and/or server applications, and/or web browser applications. Alternatively, a user computer, user device, or customer device 605 can be any other electronic device, such as a thin-client computer, Internet-enabled mobile telephone, and/or personal digital assistant, capable of communicating via a network (e.g., the network(s) 610 described below) and/or of displaying and navigating web pages or other types of electronic documents. Although the exemplary system 600 is shown with two user computers, user devices, or customer devices 605, any number of user computers, user devices, or customer devices can be supported.

Certain embodiments operate in a networked environment, which can include a network(s) 610. The network(s) 610 can be any type of network familiar to those skilled in the art that can support data communications using any of a variety of commercially-available (and/or free or proprietary) protocols, including, without limitation, TCP/IP, SNA™, IPX™, AppleTalk™, and the like. Merely by way of example, the network(s) 610 (similar to network(s) 145 FIG. 1, or the like) can each include a local area network ("LAN"), including, without limitation, a fiber network, an Ethernet network, a Token-Ring™ network and/or the like; a wide-area network ("WAN"); a wireless wide area network ("WWAN"); a virtual network, such as a virtual private network ("VPN"); the Internet; an intranet; an extranet; a public switched telephone network ("PSTN"); an infra-red network; a wireless network, including, without limitation, a network operating under any of the IEEE 802.11 suite of protocols, the Bluetooth™ protocol known in the art, and/or any other wireless protocol; and/or any combination of these and/or other networks. In a particular embodiment, the network might include an access network of the service provider (e.g., an Internet service provider ("ISP")). In another embodiment, the network might include a core network of the service provider, and/or the Internet.

Embodiments can also include one or more server computers 615. Each of the server computers 615 may be configured with an operating system, including, without limitation, any of those discussed above, as well as any commercially (or freely) available server operating systems. Each of the servers 615 may also be running one or more applications, which can be configured to provide services to one or more clients 605 and/or other servers 615.

Merely by way of example, one of the servers 615 might be a data server, a web server, a cloud computing device(s), or the like, as described above. The data server might include (or be in communication with) a web server, which can be used, merely by way of example, to process requests for web pages or other electronic documents from user computers 605. The web server can also run a variety of server applications, including HTTP servers, FTP servers, CGI servers, database servers, Java servers, and the like. In some embodiments of the invention, the web server may be configured to serve web pages that can be operated within a web browser on one or more of the user computers 605 to perform methods of the invention.

The server computers 615, in some embodiments, might include one or more application servers, which can be configured with one or more applications accessible by a client running on one or more of the client computers 605 and/or other servers 615. Merely by way of example, the server(s) 615 can be one or more general purpose computers capable of executing programs or scripts in response to the user computers 605 and/or other servers 615, including, without limitation, web applications (which might, in some cases, be configured to perform methods provided by various embodiments). Merely by way of example, a web application can be implemented as one or more scripts or programs written in any suitable programming language, such as Java™, C, C#™ or C++, and/or any scripting language, such as Perl, Python, or TCL, as well as combinations of any programming and/or scripting languages. The application server(s) can also include database servers, including, without limitation, those commercially available from Oracle™, Microsoft™, Sybase™, IBM™, and the like, which can process requests from clients (including, depending on the configuration, dedicated database clients, API clients, web browsers, etc.) running on a user computer, user device, or customer device 605 and/or another server 615. In some embodiments, an application server can perform one or more of the processes for implementing media content streaming or playback, and, more particularly, to methods, systems, and apparatuses for implementing content navigation or selection using touch-based input, as described in detail above. Data provided by an application server may be formatted as one or more web pages (comprising HTML, JavaScript, etc., for example) and/or may be forwarded to a user computer 605 via a web server (as described above, for example). Similarly, a web server might receive web page requests and/or input data from a user computer 605 and/or forward the web page requests and/or input data to an application server. In some cases, a web server may be integrated with an application server.

In accordance with further embodiments, one or more servers 615 can function as a file server and/or can include one or more of the files (e.g., application code, data files, etc.) necessary to implement various disclosed methods, incorporated by an application running on a user computer 605 and/or another server 615. Alternatively, as those skilled in the art will appreciate, a file server can include all necessary files, allowing such an application to be invoked remotely by a user computer, user device, or customer device 605 and/or server 615.

It should be noted that the functions described with respect to various servers herein (e.g., application server, database server, web server, file server, etc.) can be performed by a single server and/or a plurality of specialized servers, depending on implementation-specific needs and parameters.

In certain embodiments, the system can include one or more databases 620*a*-620*n* (collectively, "databases 620"). The location of each of the databases 620 is discretionary: merely by way of example, a database 620*a* might reside on a storage medium local to (and/or resident in) a server 615*a* (and/or a user computer, user device, or customer device 605). Alternatively, a database 620*n* can be remote from any or all of the computers 605, 615, so long as it can be in communication (e.g., via the network 610) with one or more of these. In a particular set of embodiments, a database 620 can reside in a storage-area network ("SAN") familiar to those skilled in the art. (Likewise, any necessary files for performing the functions attributed to the computers 605, 615 can be stored locally on the respective computer and/or remotely, as appropriate.) In one set of embodiments, the database 620 can be a relational database, such as an Oracle database, that is adapted to store, update, and retrieve data in response to SQL-formatted commands. The database might be controlled and/or maintained by a database server, as described above, for example.

According to some embodiments, system 600 might further comprise a computing system 625 (similar to computing systems 105*a*, 105*b*, and 205 of FIGS. 1 and 2A, or the like), one or more main display devices 630 each with display screen 630*a* (similar to main display devices 115, 225, and 305 of FIGS. 1, 2A, 2B, 3A, 3B, and 3D-3G, or the like), one or more user devices 635 each with touchscreen display 635*a* (similar to user devices 120, 255, and 310 of FIGS. 1, 2A, 2B, 3A, 3B, and 3D-3G, or the like), one or more audio playback devices 640*a*-640*n* (similar to audio playback devices 125*a*-125*n*, 285, and 290 of FIGS. 1, 2A, and 2B, or the like), one or more media (e.g., video) content sources 645 and corresponding database(s) 650 (similar to media or video content sources (or servers) 135 and corresponding databases 140 of FIG. 1, or the like), and/or the like. In some embodiments, the computing system might comprise a media device that is communicatively coupled to a playback device(s) (i.e., one or more of main display device(s) 630, the user device(s) 105 or 635, and/or audio playback device(s) 640*a*-640*n*, or the like). In some cases, the media device might comprise one of a set-top box ("STB"), a small streaming device (e.g., a "streaming stick," or the like), a media player, a gaming console, a server computer, a desktop computer, or a laptop computer, and/or the like. The media player might comprise one of a digital versatile disc or digital video disc ("DVD") player, a Blu-ray disc ("BD") player, a player suitable for other forms of content storage media, a streaming video player, a streaming music player, or a streaming game player, and/or the like, while the playback device might comprise at least one of one or more monitors, one or more television sets, or one or more speakers, and/or the like.

In operation, the computing system 625 (and/or the main display device 630) might display a first video content on at least a portion of the display screen 630*a* of the main display device 630. The computing system 625 (and/or the user device 635 or 605) might display the first video content on at least a portion of the touchscreen display 635*a* of the user device 635 or 605, the first video content being displayed on the at least a portion of the touchscreen display of the user device mirroring (in some cases, in real time (or near real time)) the first video content being displayed on the at least a portion of the display screen of the main display device. In some cases, the resolution of the first video content that is displayed on the at least a portion of the touchscreen display 635*a* might be different from the resolution of the first video content that is displayed on the at least a portion of the display screen 630*a*. The computing system 625 (and/or the user device 635 or 605) might receive user input via the touchscreen display 635*a* of the user device 635 or 605, the user input, in some cases, comprising a first swipe in a first direction relative to a reference point on the touchscreen display 635*a* of the user device 635 or 605. In response to receiving the user input, the computing system 625 (and/or the user device 635 or 605) might shift display of the first video content along the first direction on the at least a portion of the touchscreen display 635*a* while displaying and shifting display of, with the computing system, a second video content along the first direction on the at least a portion of the touchscreen display 635*a* such that the first video content and the second video content are adjacent to each other while display of the first video content and the second video content are being shifted. The computing system 625 (and/or main display device 630) might mirror the display and the shifting of the display of the first video content and the second video content on the at least a portion of the display screen of the main display device (in some cases, in real time (or near real time)). In other words, the user's channel changes or content selection (via user interaction with the touchscreen display) would be reflected instantly and synchronously on the main display device.

In some embodiments, the shifting of the display of each of the first video content or the second video content might comprise one of a scrolling effect, a sliding effect, a flipping effect, a transitioning effect, or a dragging effect, and/or the like. Alternatively, or additionally, the shifting of the display of each of the first video content or the second video content might comprise dynamic cropping of each of the first video content or the second video content such that the first video content and the second video content maintain their display resolution and size while both are being partially displayed during shifting. In some cases, the first video content might be video content that is broadcast on a first broadcast channel, while the second video content might be video content that is broadcast on a second broadcast channel. In some instances, the first video content and the second video content might be video content among a plurality of video content available for browsing or viewing in one of a video on demand ("VoD") platform, a video streaming platform, or a digital video recording ("DVR") platform, and/or the like.

Merely by way of example, the swiping direction might be vertical, horizontal, or diagonal, and/or the like. The first and second video content can be part of a plurality of video content, which in some cases might be arranged in a grid pattern, might be grouped by genre or category, might be episodes among a plurality of episodes in a series (or a season within a series), and/or the like. Additional user input might include zoom functionality. Hand gestures that are typically used to manipulate graphical user interfaces—including, but not limited to, "zoom and pinch" finger gestures, or the like—can be used to zoom in and out of a content grid pattern, or the like. Other user input might include fast swipe functionality, which allows for continuous and rapid shifting of multiple video content along a swipe direction (as described in detail above with respect to FIGS. 1, 3, and 4).

In some embodiments, audio presentation during shifting or during grid view might include presentation, through one or more audio playback devices or speakers 640a-640n communicatively coupled to one of the computing system 625, the main display device 630, or the user device 635 or 605, of one of audio content corresponding to a user-selected video content among a plurality of video content, audio content corresponding to a video content among two or more video content that fills a majority of the display area of the touchscreen display of the user device or of the display screen of the main display device, audio content corresponding to a video content among two or more video content that covers a center position of the display area of the touchscreen display of the user device or of the display screen of the main display device, and/or the like.

According to some embodiments, the computing system 625 (and/or at least one of the user device 635 or 605 or the main display device 630) might display content information associated with one or more of the video content on corresponding at least one of the touchscreen display of the user device or of the display screen of the main display device. The content information might include, but is not limited to, one or more of channel or stream information; title or name of video content; brief description of video content; information regarding actors, directors, production crew, studio, or persons of interest associated with the video content; length of video content; remaining length of video content playback; trailers; related content (e.g., prequels, sequels, other episodes in earlier seasons, other episodes in current season, other episodes in later seasons, etc.); filming locations; still pictures associated with the video content; trivia; and/or the like. In some embodiments, the content information might be either displayed overlaid over the corresponding video content or displayed in a separate portion of the at least one of the touchscreen display of the user device or of the display screen of the main display device on which neither the video content nor any other video content are being displayed.

These and other functions of the system 600 (and its components) are described in greater detail above with respect to FIGS. 1-4.

While certain features and aspects have been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods provided by various embodiments are not limited to any particular structural and/or functional architecture but instead can be implemented on any suitable hardware, firmware and/or software configuration. Similarly, while certain functionality is ascribed to certain system components, unless the context dictates otherwise, this functionality can be distributed among various other system components in accordance with the several embodiments.

Moreover, while the procedures of the methods and processes described herein are described in a particular order for ease of description, unless the context dictates otherwise, various procedures may be reordered, added, and/or omitted in accordance with various embodiments. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—certain features for ease of description and to illustrate exemplary aspects of those embodiments, the various components and/or features described herein with respect to a particular embodiment can be substituted, added and/or subtracted from among other described embodiments, unless the context dictates otherwise. Consequently, although several exemplary embodiments are described above, it will be appreciated that the invention is intended to cover all modifications and equivalents within the scope of the following claims.

What is claimed is:

1. A method, comprising:

displaying, with a computing system, a first video content on at least a portion of a display screen of a main display device;

displaying, with the computing system, the first video content on at least a portion of a touchscreen display of a user device, the first video content being displayed on the at least a portion of the touchscreen display of the user device mirroring the first video content being displayed on the at least a portion of the display screen of the main display device;

receiving, with the computing system, user input via the touchscreen display of the user device, the user input comprising a first swipe in a first direction relative to a reference point on the touchscreen display of the user device;

in response to receiving the user input, shifting, with the computing system, display of the first video content along the first direction on the at least a portion of the touchscreen display while displaying and shifting, with the computing system, display of a second video content along the first direction on the at least a portion of the touchscreen display such that the first video content and the second video content are adjacent to each other while display of the first video content and the second video content are being shifted;

mirroring, with the computing system, the display and the shifting of the display of the first video content and the second video content on the at least a portion of the display screen of the main display device, wherein the first video content and the second video content continue playback as they are being shifted;

determining, with the computing system, whether the second video content fills at least half of the at least a portion of the touchscreen display of the user device;

based on a determination that the second video content fills less than half of the at least a portion of the touchscreen display of the user device, presenting or continuing presenting, with the computing system, first audio content associated with the first video content; and based on a determination that the second video content fills at least half of the at least a portion of the touchscreen display of the user device, presenting or continuing presenting, with the computing system, second audio content associated with the second video content;

wherein each of the first audio content or the second audio content is presented using at least one of an audio playback device that is integrated within the main display device, an audio playback device that is external yet communicatively coupled to the main display device, an audio playback device that is integrated within the user device, or an audio playback device that is external yet communicatively coupled to the user device.

2. The method of claim 1, wherein the computing system comprises one of a set-top box, a small streaming device, a digital video recording ("DVR") device, a processor on the main display device running a software application ("app"), a processor on the user device running an app, a server computer over a network, a cloud-based computing system over a network, a media player, or a gaming console.

3. The method of claim 1, wherein the main display device comprises one of a television set, a smart television, a projection system, a computer monitor, or a laptop monitor.

4. The method of claim 1, wherein the user device comprises one of a laptop computer, a tablet computer, a smart phone, a mobile phone, a personal digital assistant, a remote control device, or a portable gaming device.

5. The method of claim 1, wherein the shifting of the display of each of the first video content or the second video content comprises one of a scrolling effect, a sliding effect, a flipping effect, a transitioning effect, or a dragging effect.

6. The method of claim 1, wherein the shifting of the display of each of the first video content or the second video content comprises dynamic cropping of each of the first video content or the second video content such that the first video content and the second video content maintain their display resolution and size while both are being partially displayed during shifting.

7. The method of claim 1, wherein the first video content is video content that is broadcast on a first broadcast channel, while the second video content is video content that is broadcast on a second broadcast channel.

8. The method of claim 1, wherein the first video content and the second video content are video content among a plurality of video content available for browsing or viewing in one of a video on demand ("VoD") platform, a video streaming platform, or a digital video recording ("DVR") platform.

9. The method of claim 1, wherein mirroring the display and the shifting of the display of the first video content and the second video content on the at least a portion of the display screen of the main display device comprises mirroring, with the computing system, the display and the shifting of the display of the first video content and the second video content on the at least a portion of the display screen of the main display device, in real time or near real time.

10. The method of claim 1, wherein the first direction is one of a vertical direction with respect to a viewing orientation of the first video content or a horizontal direction with respect to the viewing orientation of the first video content.

11. The method of claim 1, wherein the first video content and the second video content are video content among a plurality of video content that are arranged in a grid pattern with one video content being adjacent to eight video content, wherein the first direction is one of a diagonal direction with respect to a viewing orientation of the first video content, wherein, in response to receiving the user input comprising a swipe in the diagonal direction, portions of the plurality of video content in the grid pattern is shifted along the diagonal direction on one or both of the touchscreen display of the user device or the display screen of the main display device.

12. The method of claim 11, further comprising:

receiving, with the computing system, a second user input via the touchscreen display of the user device, the second user input comprising multiple-finger input indicating one of zoom-in or zoom-out;

in response to receiving the second user input, performing, with the computing system, corresponding one of zooming in or zooming out of display of the plurality of video content in the grid pattern on the at least a portion of the touchscreen display; and mirroring, with the computing system, the corresponding one of zooming in or zooming out of the display of the plurality of video content in the grid pattern on the at least a portion of the display screen of the main display device.

13. The method of claim 11, further comprising:

determining, with the computing system, whether the user has selected one of the plurality of video content;

based on a determination that the user has selected one of the plurality of video content, presenting or continuing presenting, with the computing system, audio content associated with the selected one of the plurality of video content; and based on a determination that the user has not selected any of the plurality of video content, identifying, with the computing system, which one of the plurality of video content covers a center position of the at least a portion of the touchscreen display, and presenting or continuing presenting, with the computing system, audio content associated with the identified video content that covers the center position of the at least a portion of the touchscreen display;

wherein the audio content is presented using at least one of an audio playback device that is integrated within the main display device, an audio playback device that is external yet communicatively coupled to the main display device, an audio playback device that is integrated within the user device, or an audio playback device that is external yet communicatively coupled to the user device.

14. The method of claim 1, further comprising:

displaying, with the computing system, content information associated with each of at least one of the first video content or the second video content on one or both of the display screen of the main display device or the touchscreen display of the user device, wherein the content information is either displayed overlaid over corresponding at least one of the first video content or the second video content or displayed in a separate portion of the one or both of the display screen of the main display device or the touchscreen display of the user device on which neither the first video content nor the second video content are being displayed.

15. An apparatus, comprising:
at least one processor; and
a non-transitory computer readable medium communicatively coupled to the at least one processor, the non-transitory computer readable medium having stored thereon computer software comprising a set of instructions that, when executed by the at least one processor, causes the apparatus to:
display a first video content on at least a portion of a display screen of a main display device;
display the first video content on at least a portion of a touchscreen display of a user device, the first video content being displayed on the at least a portion of the touchscreen display of the user device mirroring the first video content being displayed on the at least a portion of the display screen of the main display device;
receive user input via the touchscreen display of the user device, the user input comprising a first swipe in a first direction relative to a reference point on the touchscreen display of the user device;
in response to receiving the user input, shift display of the first video content along the first direction on the at least a portion of the touchscreen display while displaying and shifting display of a second video content along the first direction on the at least a portion of the touchscreen display such that the first video content and the second video content are adjacent to each other while display of the first video content and the second video content are being shifted;
mirror the display and the shifting of the display of the first video content and the second video content on the at least a portion of the display screen of the main display device, wherein the first video content and the second video content continue playback as they are being shifted;
determine whether the second video content fills at least half of the at least a portion of the touchscreen display of the user device;
based on a determination that the second video content fills less than half of the at least a portion of the touchscreen display of the user device, present or continue presenting first audio content associated with the first video content; and
based on a determination that the second video content fills at least half of the at least a portion of the touchscreen display of the user device, present or continue presenting second audio content associated with the second video content;
wherein each of the first audio content or the second audio content is presented using at least one of an audio playback device that is integrated within the main display device, an audio playback device that is external yet communicatively coupled to the main display device, an audio playback device that is integrated within the user device, or an audio playback device that is external yet communicatively coupled to the user device.

16. The apparatus of claim 15, wherein the apparatus comprises one of a set-top box, a small streaming device, a digital video recording ("DVR") device, a processor on the main display device running a software application ("app"), a processor on the user device running an app, a server computer over a network, a cloud-based computing system over a network, a media player, or a gaming console.

17. The apparatus of claim 15, wherein the main display device comprises one of a television set, a smart television, a projection system, a computer monitor, or a laptop monitor.

18. The apparatus of claim 15, wherein the user device comprises one of a laptop computer, a tablet computer, a smart phone, a mobile phone, a personal digital assistant, a remote control device, or a portable gaming device.

19. The apparatus of claim 15, wherein the shifting of the display of each of the first video content or the second video content comprises one of a scrolling effect, a sliding effect, a flipping effect, a transitioning effect, or a dragging effect.

20. The apparatus of claim 15, wherein the shifting of the display of each of the first video content or the second video content comprises dynamic cropping of each of the first video content or the second video content such that the first video content and the second video content maintain their display resolution and size while both are being partially displayed during shifting.

21. The apparatus of claim 15, wherein the first video content is video content that is broadcast on a first broadcast channel, while the second video content is video content that is broadcast on a second broadcast channel.

22. The apparatus of claim 15, wherein the first video content and the second video content are video content among a plurality of video content available for browsing or viewing in one of a video on demand ("VoD") platform, a video streaming platform, or a digital video recording ("DVR") platform.

23. The apparatus of claim 15, wherein the first direction is one of a vertical direction with respect to a viewing orientation of the first video content or a horizontal direction with respect to the viewing orientation of the first video content.

24. The apparatus of claim 15, wherein the first video content and the second video content are video content among a plurality of video content that are arranged in a grid pattern with one video content being adjacent to eight video content, wherein the first direction is one of a diagonal direction with respect to a viewing orientation of the first video content, wherein, in response to receiving the user input comprising a swipe in the diagonal direction, portions of the plurality of video content in the grid pattern is shifted along the diagonal direction on one or both of the touchscreen display of the user device or the display screen of the main display device.

25. The apparatus of claim 15, wherein the set of instructions, when executed by the at least one processor, further causes the apparatus to:
receive a second user input via the touchscreen display of the user device, the second user input comprising multiple-finger input indicating one of zoom-in or zoom-out;
in response to receiving the second user input, perform corresponding one of zooming in or zooming out of display of the plurality of video content in the grid pattern on the at least a portion of the touchscreen display; and
mirror the corresponding one of zooming in or zooming out of the display of the plurality of video content in the grid pattern on the at least a portion of the display screen of the main display device.

26. The apparatus of claim 15, wherein the set of instructions, when executed by the at least one processor, further causes the apparatus to:
  determine whether the user has selected one of the plurality of video content;
  based on a determination that the user has selected one of the plurality of video content, present or continue presenting audio content associated with the selected one of the plurality of video content;
  based on a determination that the user has not selected any of the plurality of video content, identify which one of the plurality of video content covers a center position of the at least a portion of the touchscreen display, and present or continue presenting audio content associated with the identified video content that covers the center position of the at least a portion of the touchscreen display;
  wherein the audio content is presented using at least one of an audio playback device that is integrated within the main display device, an audio playback device that is external yet communicatively coupled to the main display device, an audio playback device that is integrated within the user device, or an audio playback device that is external yet communicatively coupled to the user device.

27. The apparatus of claim 15, wherein the set of instructions, when executed by the at least one processor, further causes the apparatus to:
  display content information associated with each of at least one of the first video content or the second video content on one or both of the display screen of the main display device or the touchscreen display of the user device, wherein the content information is either displayed overlaid over corresponding at least one of the first video content or the second video content or displayed in a separate portion of the one or both of the display screen of the main display device or the touchscreen display of the user device on which neither the first video content nor the second video content are being displayed.

28. A system, comprising:
  a computing system, comprising:
    at least one first processor; and
    a first non-transitory computer readable medium communicatively coupled to the at least one first processor, the first non-transitory computer readable medium having stored thereon computer software comprising a first set of instructions that, when executed by the at least one first processor, causes the computing system to:
      send a first video content to a main display device for display of the first video content on the main display device; and
      send the first video content to a user device for display of the first video content on the display device, the first video content being displayed on the user device mirroring the first video content being displayed on the main display device;
  the main display device, comprising:
    a display screen;
    at least one second processor; and
    a second non-transitory computer readable medium communicatively coupled to the at least one second processor, the second non-transitory computer readable medium having stored thereon computer software comprising a second set of instructions that, when executed by the at least one second processor, causes the main display device to:
      receive the first video content from the computing system; and
      display the first video content on at least a portion of the display screen of the main display device; and
  the user device, comprising:
    a touchscreen display;
    at least one third processor; and
    a third non-transitory computer readable medium communicatively coupled to the at least one third processor, the third non-transitory computer readable medium having stored thereon computer software comprising a third set of instructions that, when executed by the at least one third processor, causes the user device to:
      receive the first video content from the computing system;
      display the first video content on at least a portion of the touchscreen display of the user device;
      receive user input via the touchscreen display of the user device, the user input comprising a first swipe in a first direction relative to a reference point on the touchscreen display of the user device; and
      relay the received user input to the computing system;
  wherein the first set of instructions, when executed by the at least one first processor, further causes the computing system to:
    receive the user input from the user device;
    in response to receiving the user input, send display commands to the user device to shift display of the first video content along the first direction on the at least a portion of the touchscreen display while displaying and shifting display of a second video content along the first direction on the at least a portion of the touchscreen display such that the first video content and the second video content are adjacent to each other while display of the first video content and the second video content are being shifted; and
    send display commands to the main display device to mirror the display and shifting of the display of the first video content and the second video content on the at least a portion of the display screen of the main display device;
  wherein the third set of instructions, when executed by the at least one third processor, further causes the user device to:
    in response to receiving display commands from the computing system, shift display of the first video content along the first direction on the at least a portion of the touchscreen display while displaying and shifting display of a second video content along the first direction on the at least a portion of the touchscreen display such that the first video content and the second video content are adjacent to each other while display of the first video content and the second video content are being shifted; and
  wherein the second set of instructions, when executed by the at least one second processor, further causes the main display device to:
    in response to receiving display commands from the computing system, mirror the display and shifting of the display of the first video content and the second video content on the at least a portion of the display screen of the main display device, wherein the first video content and the second video content continue playback as they are being shifted;

wherein the first set of instructions, when executed by the at least one first processor, further causes the computing system to:
  determine whether the second video content fills at least half of the at least a portion of the touchscreen display of the user device;
  based on a determination that the second video content fills less than half of the at least a portion of the touchscreen display of the user device, present or continue presenting first audio content associated with the first video content; and
  based on a determination that the second video content fills at least half of the at least a portion of the touchscreen display of the user device, present or continue presenting second audio content associated with the second video content;
wherein each of the first audio content or the second audio content is presented using at least one of an audio playback device that is integrated within the main display device, an audio playback device that is external yet communicatively coupled to the main display device, an audio playback device that is integrated within the user device, or an audio playback device that is external yet communicatively coupled to the user device.

29. The system of claim 28, wherein the computing system comprises one of a set-top box, a small streaming device, a digital video recording ("DVR") device, a processor on the main display device running a software application ("app"), a processor on the user device running an app, a server computer over a network, a cloud-based computing system over a network, a media player, or a gaming console.

30. The system of claim 28, wherein the main display device comprises one of a television set, a smart television, a projection system, a computer monitor, or a laptop monitor.

31. The system of claim 28, wherein the user device comprises one of a laptop computer, a tablet computer, a smart phone, a mobile phone, a personal digital assistant, a remote control device, or a portable gaming device.

* * * * *